US008293674B2

(12) United States Patent
Chung et al.

(10) Patent No.: US 8,293,674 B2
(45) Date of Patent: Oct. 23, 2012

(54) CATALYST SYSTEM FOR PREPARING CYCLIC OLEFIN ADDITION POLYMER, CYCLIC OLEFIN ADDITION POLYMER PREPARED BY USING THE CATALYST SYSTEM AND METHOD FOR PREPARING THE SAME

(75) Inventors: Sung-Ho Chung, Daejeon (KR); Won-Kook Kim, Daejeon (KR); Sung-Cheol Yoon, Daejeon (KR); Tae-Sun Lim, Daejeon (KR); Heon Kim, Daejeon (KR); Kyoung-Hoon Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/162,142

(22) Filed: Jun. 16, 2011

(65) Prior Publication Data

US 2011/0245069 A1    Oct. 6, 2011

Related U.S. Application Data

(60) Division of application No. 11/938,037, filed on Nov. 9, 2007, now Pat. No. 7,989,570, which is a continuation-in-part of application No. 10/494,882, filed as application No. PCT/KR03/01350 on Jul. 7, 2003, now Pat. No. 7,312,285.

(30) Foreign Application Priority Data

Jul. 10, 2002  (KR) .................. 10-2002-0040044
Jun. 24, 2003  (KR) .................. 10-2003-0041039

(51) Int. Cl.
*C08F 4/44* (2006.01)

(52) U.S. Cl. ........ 502/155; 526/171; 526/172; 526/280; 526/281

(58) Field of Classification Search .................. 502/155; 526/171, 172, 280, 281
See application file for complete search history.

(56) References Cited

U.S. PATENT DOCUMENTS

| 3,330,815 | A | 7/1967 | McKeon et al. |
| 4,831,172 | A | 5/1989 | Hahn et al. |
| 5,011,730 | A | 4/1991 | Tenney et al. |
| 5,179,171 | A | 1/1993 | Minami et al. |
| 5,468,819 | A | 11/1995 | Goodall et al. |
| 5,705,503 | A | 1/1998 | Goodall et al. |
| 6,350,832 | B1 | 2/2002 | Bell et al. |
| 6,455,650 | B1 * | 9/2002 | Lipian et al. .................. 526/171 |
| 2002/0042461 | A1 | 4/2002 | Oshima et al. |
| 2002/0052454 | A1 | 5/2002 | Lipian et al. |
| 2003/0119961 | A1 | 6/2003 | Oshima et al. |
| 2005/0010006 | A1 | 1/2005 | Chun et al. |

FOREIGN PATENT DOCUMENTS

| EP | 0729480 | B1 | 1/1999 |
| EP | 1111466 | A1 | 6/2001 |
| EP | 1132774 | A2 | 9/2001 |
| JP | 08271731 | | 10/1996 |
| JP | 2000169517 | | 6/2000 |
| JP | 2000508080 | | 6/2000 |
| JP | 2001516804 | | 10/2001 |
| JP | 2001519821 | | 10/2001 |
| KR | 1020010065713 | A | 7/2001 |
| KR | 1020010075435 | | 8/2001 |
| KR | 1020040005593 | A | 1/2004 |
| WO | 0148519 | A1 | 7/2001 |
| WO | 0220472 | A1 | 3/2002 |

OTHER PUBLICATIONS

Bergner, et al., "Ab initio energy-adjusted pseudopotentials for elements of groups 13-17", Molecular Physics, 1993, vol. 80, No. 6, 1431-1441; Istitut fur Theoretische Chemie, Universitat Stuttgart, Pfaffenwaldring 55, 70550 Stuttgart, Federal Republic of Germany.

B. Delley, "A Scattering Theoretic Approach to Scalar Relativistic Corrections on Bonding", International Journal of Quantum Chemistry, vol. 69,423-433 (1998): Paul Scherrer Institut, WHGA/123, CH-5232 Villigen PSI, Switzerland.

M. Dolg, et al., "Energy-adjusted ab initio pseudopotentials for the first row transition elements", J. Chem Phys., vol. 86, No. 2, p. 866, Jan. 15, 1987, Institut fur theoretische chemie, Universitat Stuttgart, Pfaffenwaldring 55, D-7000 Stuttgart 80, West Germany.

C. Tolman., "Steric Effects of Phosphorus Ligands in Organometallic Chemistry and Homogeneous Catalysis" Chemical Reviews, 1997, vol. 77, No. 3.; Central Research and Development Department E. I. du Pont de Nemours and Company, Experimental Station, Wilmington, Delware 19898.

A. Hennis et al., "Novel, Efficient, Palladium-Based System for the Polymerization of Norborene Derivatives: Scope and Mechanism", American Chemical Society, Organometallics 2001, 20. 2802-2812; Department of Chemistry, The Pennsylvania State University, University Park, Pennsylvania 16802.

Breunig, "Transition-metal-catalyzed vinyl addition polymerizations of norborene derivatives with ester groups", Makromol. Chem. 193, 2915-2929 (1992); Philipps Universitat Marburg, Fachbereich Physikalische Chemie-Polymere, Hans Meerweinstr., 3550 Marburg, Germany.

Sen, "Catalysis by Solvated Transition-Metal Cations. Novel Catalytic Transformations of Alkenes by Tetrakis (acetonitrile) palladium Ditetrafluoroborate. Evidence for the Formation of Incipient Carbonium Ions as intermediates", J Am. Chem. Soc. 1981, 103, 4627-4629; Chandlee Laboratory, Department of Chemistry, The Pennsylvania State University, University Park, Pennsylvania 16802.

(Continued)

*Primary Examiner* — Robert D. Harlan
(74) *Attorney, Agent, or Firm* — Rothwell, Figg, Ernst & Manbeck, P.C.

(57) ABSTRACT

The present invention relates to a catalyst system for preparing a cyclic olefin addition polymer, a method for preparing the catalyst system and a cyclic olefin addition polymer prepared by the method, and more particularly to the method comprising the steps of contacting some content of norbornene-based monomer having a specific polar functional group with a catalyst system comprising a) a Group X transition metal compound; b) a compound comprising a neutral Group XV electron donor ligand having a cone angle of at least 160°; and c) a salt capable of offering an anion that can be weakly coordinated to the transition metal of the a) the Group X transition metal compound.

7 Claims, 8 Drawing Sheets

OTHER PUBLICATIONS

B. Vernyi, "DuPont Co. announces catalyst for polyofins", Crains's International Newspaper for the Plastic Industry; Plastics News, Feb. 5, 1996.

Norman G. Gaylord, et al., "Poly-2, 3-and 2, 7-Bicyclo{2.2.1}hept-2enes: Preparation and Structures of Polynorborenes", J. Macromol. Sci-Chem, A11(5), pp. 1053-1070 (1977); Gaylord Research Institute Inc., New Providence, New Jersey 07974.

Kaminsky, "31. Polymerization of Cyclic Olefins with Homogeneous Catalysts" Stud. Surf. Catal. 1990, vol. 56, p. 425,Institut fur Anorganische und Angewandte chemie, Universitat Hamburg, Martin-Luther-King Platz 6, 2 Hamburg 13, F.R.G.

P. Hohenberg, et al., "Inhomogeneous Electron Gas", Physical Review, vol. 136, No. 3B, p. 864, Nov. 9, 1964; Ecole Normale Superieure, Paris, France, pp. B864-B871.

Matthew, et al"(n3-Allyl) palladium (II) and Palladium (II) Nitrile Catalysts for the Addition Polymerization of Norborene Derivatives with Functional Groups", Macromolecules 1996, 29. 2755-2763, Department of Chemistry, University College Dublin, Belfield, Dublin 4. Ireland pp. 2755-2763.

W. Kohn, et al., "Self-Consistent Equations Including Exchange and Correlation Effects", Physical Review, vol. 140, No. 4A, Nov. 15, 1965; University of California, San Diego, La Jolla, California pp. 1133-1138.

B. Delley, "An all-electron numerical method for solving the local density functional for polyatomic molecules", J. Chem Phys, 92 (1), Jan. 1990. pp. 508-517.

"Hoechst AG, Mitsui to make cyclo-olefins"; Plastic News; p. 24; Feb. 27, 2005.

* cited by examiner

[Figure 1]
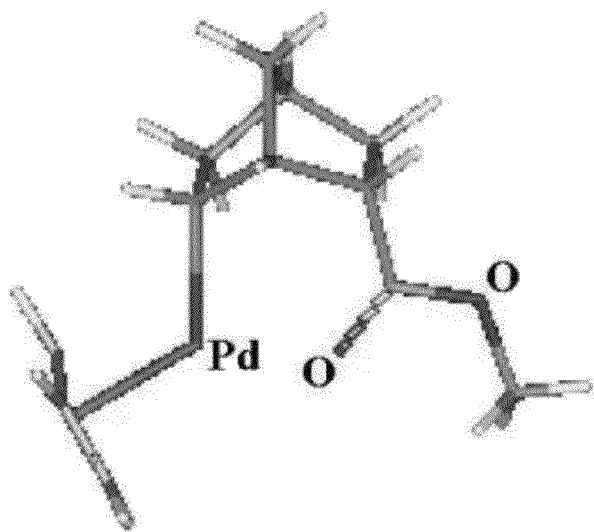
[Figure 2]
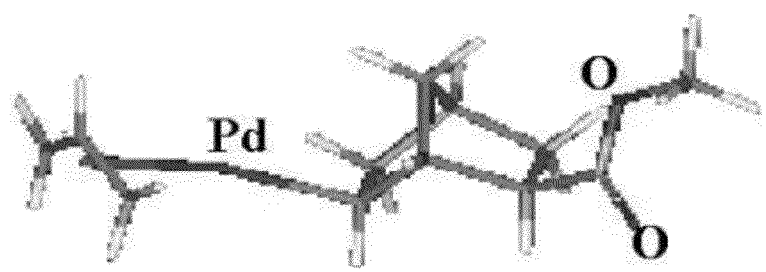

[Figure 3a]
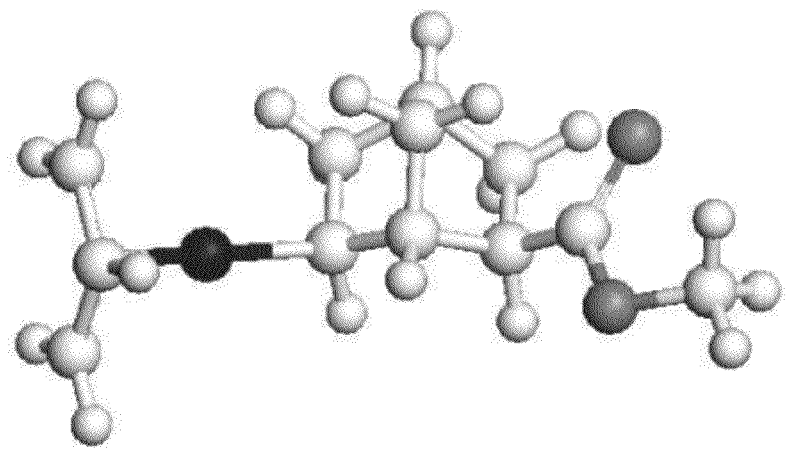
[Figure 3b]
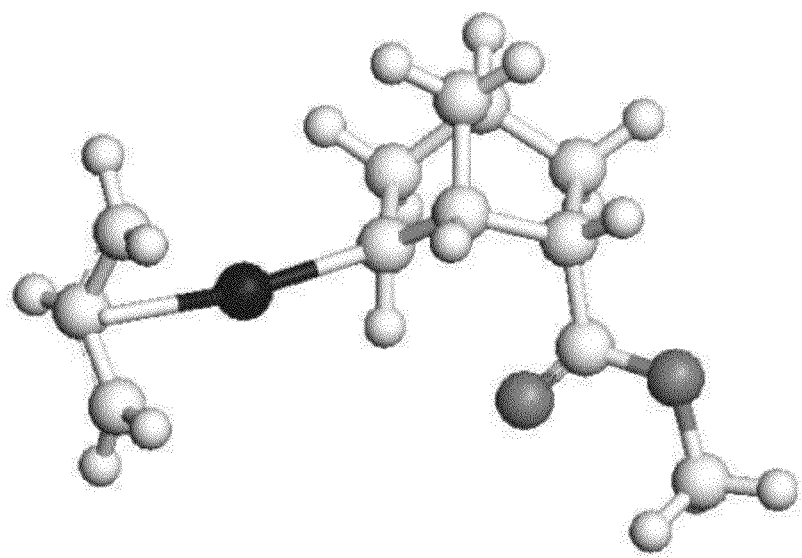

[Figure 3c]
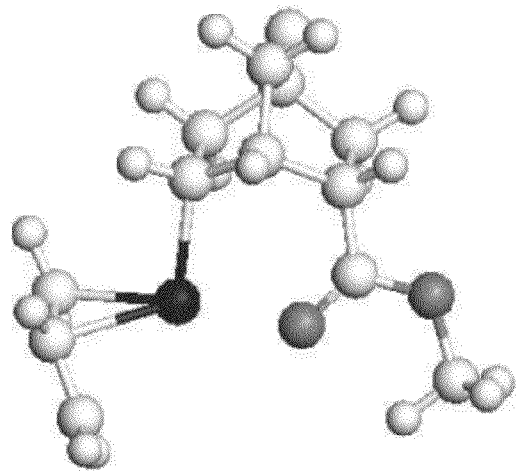
[Figure 4a]
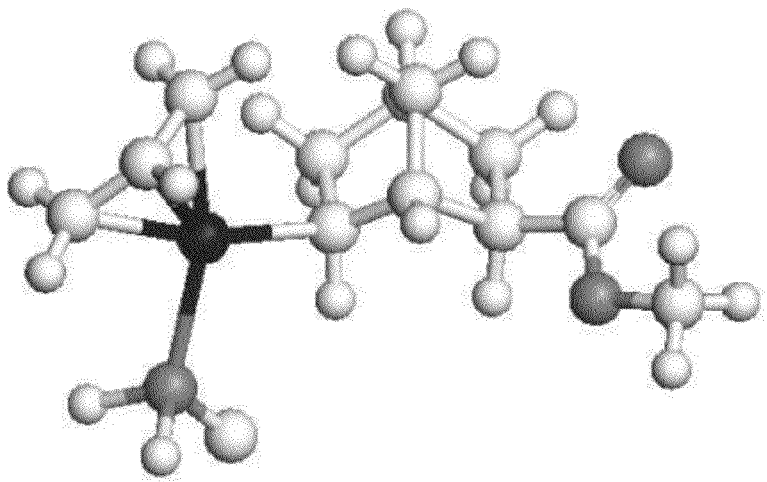

[Figure 4b]
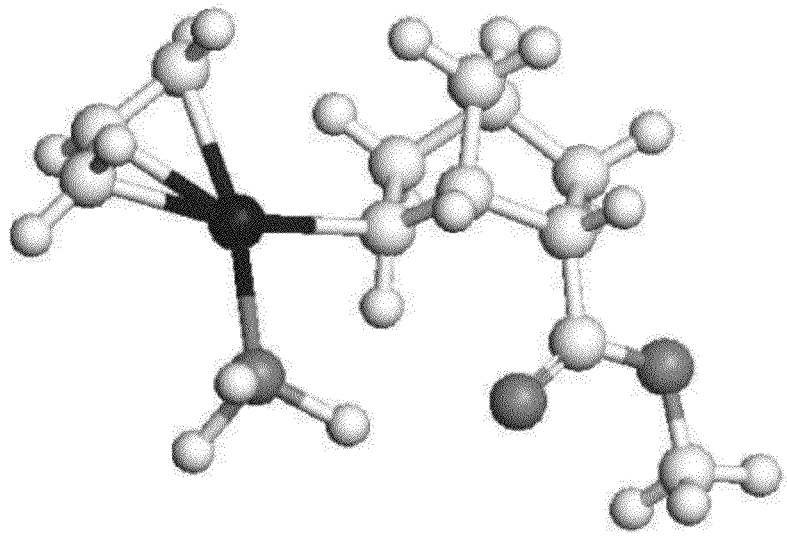
[Figure 4c]
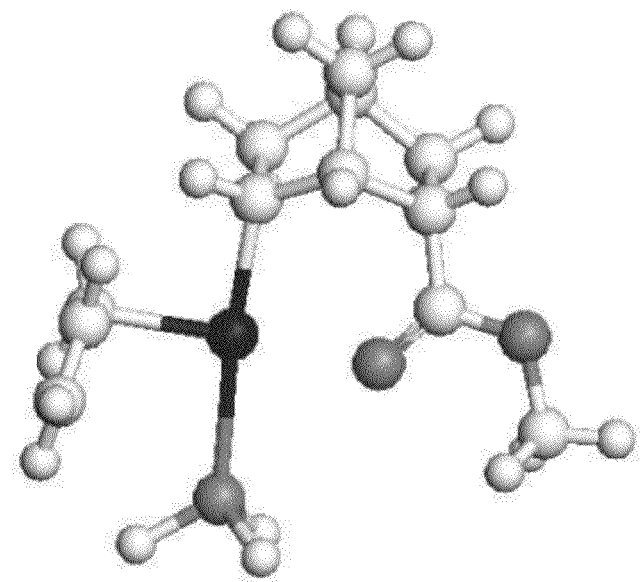

[Figure 5a]
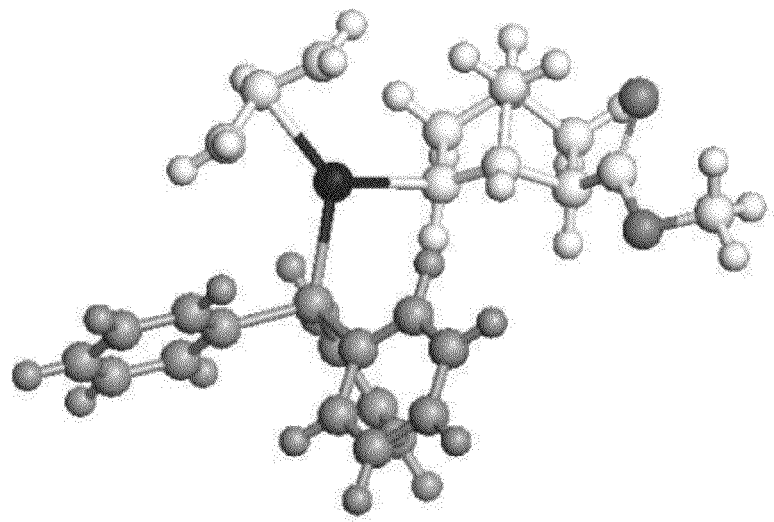
[Figure 5b]
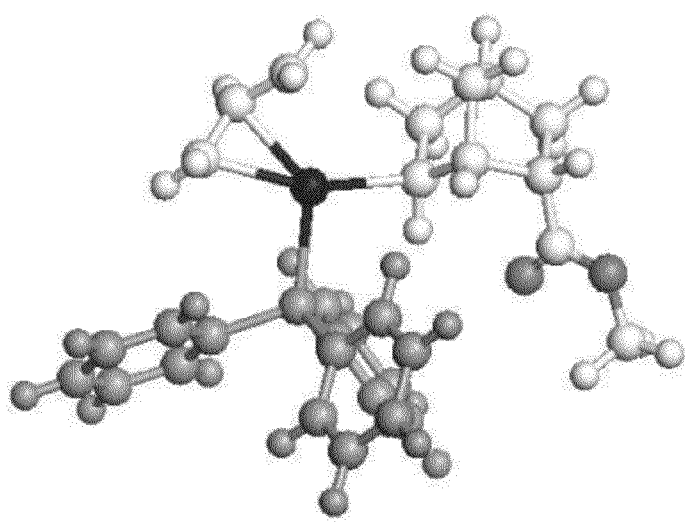

[Figure 5c]
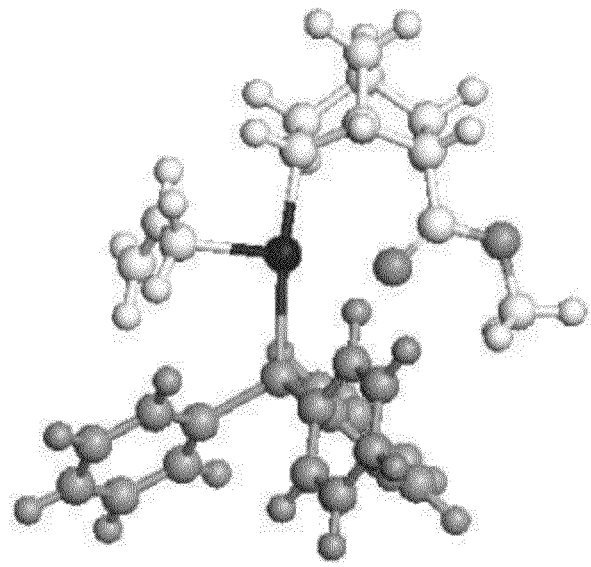
[Figure 6a]
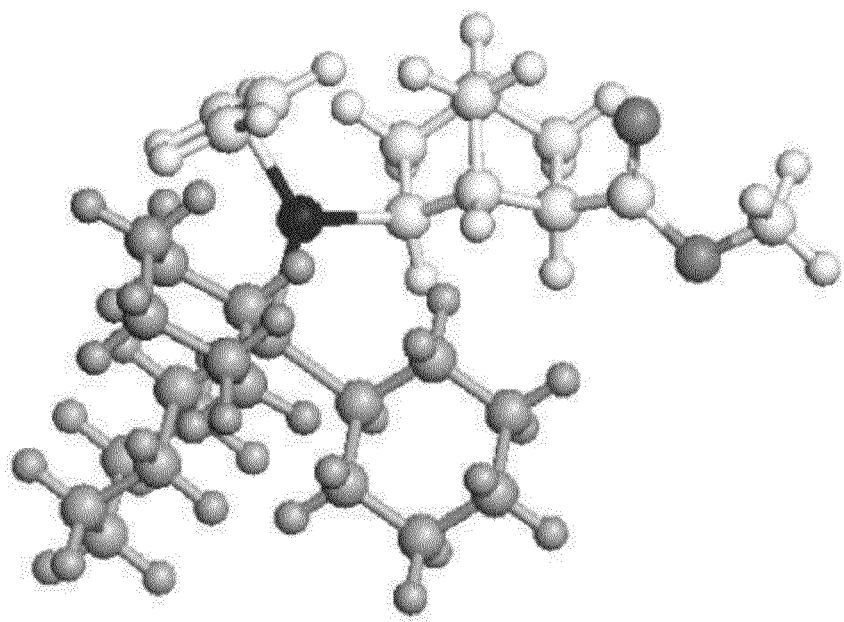

[Figure 6b]
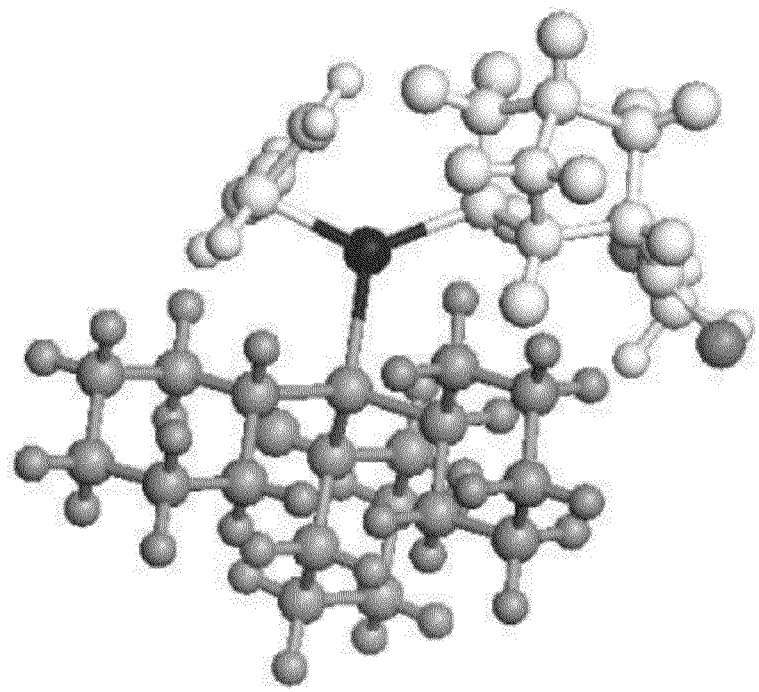
[Figure 6c]
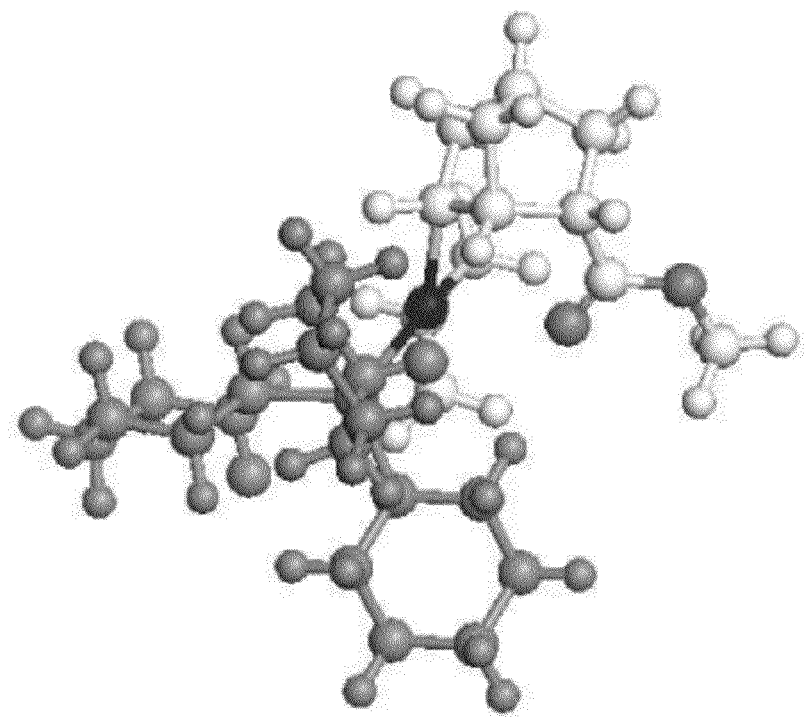

[Figure 7]
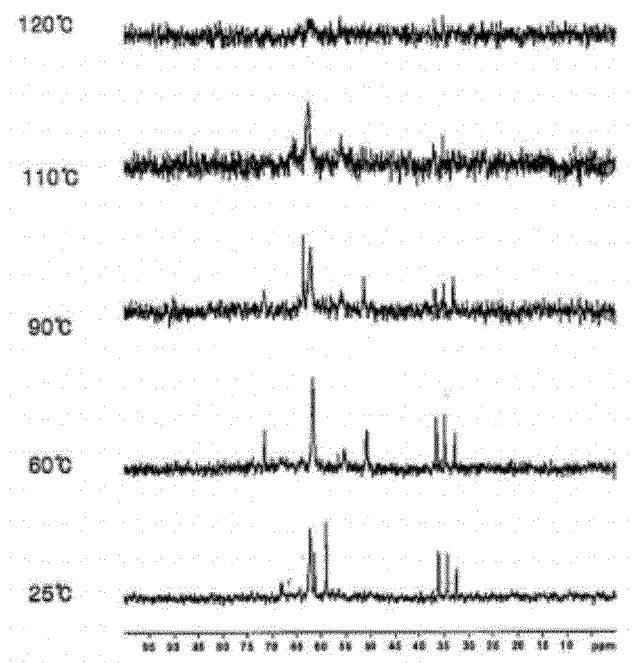
[Figure 8]
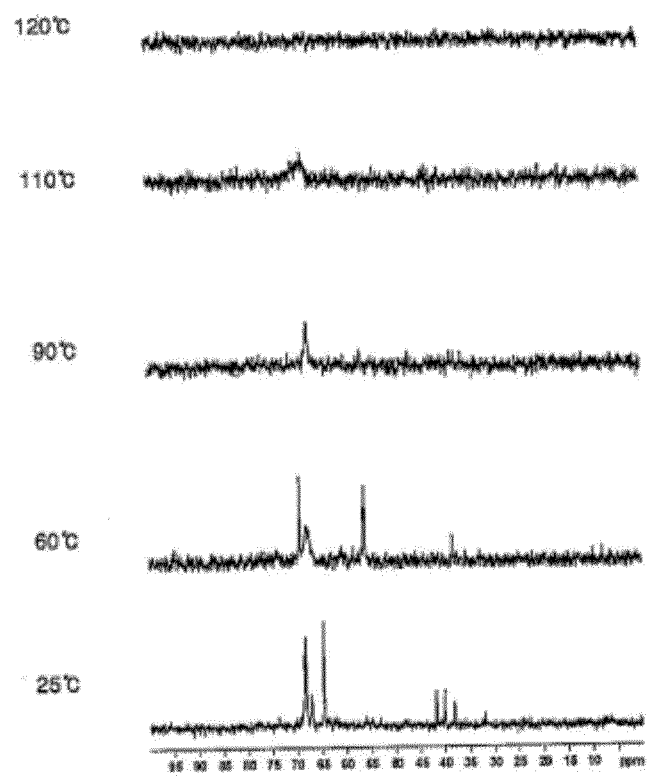

CATALYST SYSTEM FOR PREPARING CYCLIC OLEFIN ADDITION POLYMER, CYCLIC OLEFIN ADDITION POLYMER PREPARED BY USING THE CATALYST SYSTEM AND METHOD FOR PREPARING THE SAME

CROSS REFERENCE TO RELATED APPLICATION

This application is a divisional application of U.S. patent application Ser. No. 11/938,037, filed Nov. 9, 2007, now U.S. Pat. No. 7,989,570 which is a continuation-in-part application of U.S. patent application Ser. No. 10/494,882 filed on May 7, 2004, now U.S. Pat. No. 7,312,285, issued Dec. 25, 2007, which is a National Stage filing under 35 U.S.C. 371 of International Application No. PCT/KR03/01350, filed on Jul. 7, 2003, and which claims priority to Korean Patent Application Nos. 10-2002-0040044, filed on Jul. 10, 2002, and 10-2003-0041039, filed on Jun. 24, 2003, and all the benefits accruing therefrom under 35 U.S.C. 119, the contents of which in their entirety are herein incorporated by reference.

FIELD OF INVENTION

The present invention relates to a catalyst system for preparing a cyclic olefin addition polymer, cyclic olefin addition polymer prepared by using the catalyst system and method for preparing the same. More particularly, the present invention relates to a cyclic olefin addition polymer comprising some content of norbornene-based monomer having a specific polar functional group, a catalyst system for preparing cyclic olefin addition polymer and a method for polymerization using the catalyst system.

DESCRIPTION OF THE RELATED ART

Currently, PMMA (polymethylmethacrylate) or PC (polycarbonate) is widely used for a transparent polymer. Although PMMA has good transparency, it has poor dimensional stability due to its high hygroscopicity. Therefore, it is not suitable for material for precision optical devices or displays.

Until now, inorganic substances such as silicon oxide or silicon nitride have been predominantly used for insulation materials. However, with the increasing need of small-sized and highly efficient devices, new high functional materials are required. In this regard, polymers having a low dielectric constant and hygroscopicity, superior adhesion to metal, strength, thermal stability transparency and high glass transition temperature (Tg>250° C.) attract a lot of attentions.

Such polymers may be used for insulation films of semiconductor devices or TFT-LCDs, polarizer protection films for polarizer, multichip modules, integrated circuits (ICs), printed circuit boards, and molding compounds for electronic devices or optical materials for flat panel displays. Currently, polyimide BCB (bis-benzocyclobutene), etc. are used as low dielectric materials for electronic devices.

Polyimide has long been used for electronic devices due to its thermal stability, oxidative stability, high glass transition temperature, and superior mechanical properties. However, it involves problems of corrosion due to high hygroscopicity, an increase in dielectric constant, its anisotropic electric property, a need for pre-treatment to reduce reaction with copper wire, its adhesion to metals, etc.

Although BCB has lower hygroscopicity and a lower dielectric constant than polyimide, its adhesion to metal is not good and curing at high temperature is required to obtain desired physical properties. Physical properties of BCB are affected by curing time and temperature.

Cyclic olefin copolymers are known to have low dielectric constants and hygroscopicity due to their high hydrocarbon content. Cyclic monomers can be polymerized by ROMP (ring opening metathesis polymerization), HROMP (ring opening metathesis polymerization followed by hydrogenation), or copolymerization with ethylene and homogeneous polymerization, as shown in the following Scheme 1.

Scheme. I

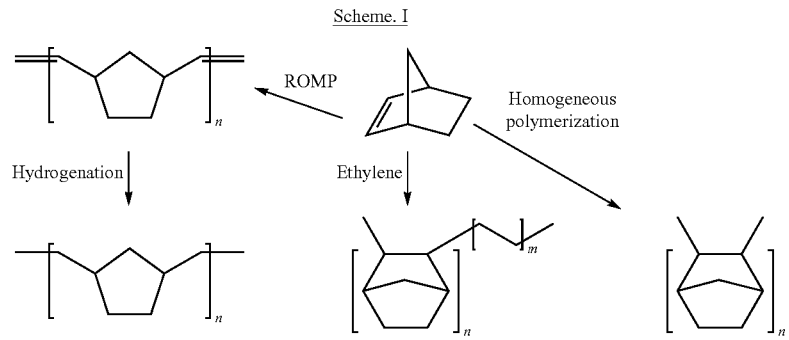

Polymers synthesized by ROMP have poor thermal stability and oxidative stability due to unsaturation of the main chain, and are used as thermoplastic resins or thermosetting resins. Tenny et al. discloses in U.S. Pat. No. 5,011,730 that a thermosetting resin prepared by the above method can be used as a circuit board by reaction injection molding. However, as mentioned above, it has problems of thermal stability, oxidative stability, and low glass transition temperature.

There has been an attempt to stabilize the main chain of the polymer by hydrogenation. Although a polymer prepared by this method has improved oxidative stability, the thermal stability is reduced. In general, hydrogenation increases the glass transition temperature of a ROMP polymer by about 50° C. but because of the ethylene groups located between the cyclic monomers, the glass transition temperature is still low (Metcon 99). Moreover, a cost increase due to increased polymerization steps and weak mechanical properties of the polymer are hindering its commercial use.

From addition co-polymerization with ethylene, a product called Apel was obtained using a homogeneous vanadium catalyst. However, this method has problems of low catalytic activity and generation of excessive oligomers.

A zirconium based metallocene catalyst has been reported to give a polymer having a narrow molecular weight distribution and a large molecular weight (Plastic News, Feb. 27, 1995, p. 24). However, the activity of the catalyst decreases with the increase of cyclic monomer concentration and the obtained copolymer has a low glass transition temperature (Tg<200° C.). In addition, although the thermal stability increases, mechanical strength is weak and chemical resistance against solvents such as halogenated hydrocarbon solvents is poor.

Gaylord et al. have reported addition polymerization of norbornene in 1977 (Gaylord, N. G.; Deshpande, A. B.; Mandal, B. M.; Martan, M. J. Macromol. Sci.-Chem. 1977, A11 (5), 1053-1070). [Pd($C_6H_5CN$)$Cl_2$]$_2$ was used as a catalyst and the yield was 33%. Later, a norbornene polymer was prepared using a [Pd($CH_3CN$)$_4$][$BF_4$]$_2$ catalyst (Sen. A.; Lai, T.-W. J. Am. Chem. Soc. 1981, 103, 4627-4629).

Kaminsky et al. have reported homogeneous polymerization of norbornene using a zirconium-based metallocene catalyst (Kaminsky, W.; Bark, A.; Drake, I. Stud. Surf Cata/. 1990, 56,425). However, since a polymer obtained by this method is very crystalline and is hardly soluble in organic solvent, and thermal decomposition occurs without showing glass transition temperature, further studies could not be conducted.

Like the above-explained polyimide or BCB, the cyclic polymers also have poor adhesion to metal. For a polymer to be used for electronic devices, it should have good adhesion to a variety of surfaces, such as silicon, silicon oxide, silicon nitride, alumina, copper, aluminum, gold, silver, platinum, titanium, nickel, tantalum, chromium, and other polymers.

The following method has been introduced to increase adhesion of polyimide, BCB, etc. to metal. A substrate is treated with an organic silicon coupling agent having two functional groups such as amino-propyltriethoxysilane or triethoxyvinylsilane. Then, the substrate is reacted with a polymer or polymer precursor. In this reaction, it is believed that the hydrolyzed silyl group reacts with the hydroxy group on the substrate surface to form a covalent bond.

A cyclic polymer can be used for insulating electronic devices, replacing inorganic materials such as silicon oxide or silicon nitride. For a functional polymer to be used for electronic devices, it should have a low dielectric constant and hygroscopicity superior adhesion to metal, strength, thermal stability, transparency, and a high glass transition temperature (Tg>250° C.).

Such a polymer can be used for insulation films of semiconductor devices or TFT-LCDs. Here, amino groups on the substrate surface react with functional groups of the polymer or polymer precursor to form bridges linking the substrate and the polymer. This technique has been disclosed in U.S. Pat. No. 4,831,172. However, this method is a multi-step process and requires a coupling agent.

Introduction of functional groups to a polymer comprising hydrocarbons is a useful method for the control of chemical and physical properties of the polymer. However, introduction of functional groups is not easy because unshared electron pairs of the functional groups tend to react with active catalytic sites. A polymer obtained by polymerizing cyclic monomers having functional groups has a low molecular weight (U.S. Pat. No. 3,330,815).

In order to overcome this problem, a method of adding the monomers having functional groups at a later step of polymerization (U.S. Pat. No. 5,179,171) has been proposed. However, thermal stability of the polymer has not increased by this method. Also, physical and chemical properties and adhesion to metal has not improved significantly.

As an alternative, a method of reacting functional groups with a base polymer in the presence of a radical initiator has been introduced. However, this method involves problems in that the grafting site of the substituents cannot be controlled and only a small amount of radicals are grafted. The excessive radicals cut the polymers to decrease molecular weight of the polymer. Or, they are not grafted to the base polymer but polymerize with other radicals.

When a polycyclic compound having a silyl group is used for an insulation film, it adheres to metal and by-products such as water or ethanol are produced, which are not completely removed to increase dielectric constant or cause corrosion of another metal.

Polymerization or copolymerization of norbornene having an ester or acetyl group has attracted continuous attentions (Risse et al., Macromolecules, 1996, Vol. 29, 2755-2763; Risse et al., Makromol. Chem. 1992 Vol. 193, 2915-2927); Sen et al., Organometallics 2001, Vol. 20, 2802-2812, Goodall, et al., U.S. Pat. No. 5,705,503, Lipian, et al., WO00/20472). Risse et al. activated a [($\eta$ 3-ally) PdCl]$_2$ palladium compound with a catalyst such as $AgBF_4$ or $AgSbF_6$ or used a catalyst such as [Pd(RCN)$_4$][$BF_4$]$_2$. Sen, et al. activated [(1, 5-cyclooctadiene)($CH_3$)Pd(Cl)] with a phosphine such as $PPh_3$ and a catalyst such as $Na^{+[}3,5-(CF_3)_2C_6H_3]_4NB^-$. U.S. Pat. No. 5,705,503 used a catalyst system similar to that reported by Risse, et al. ([($\eta$ 3-ally)PdCl]$_2$ was activated with $AgBF_4$ or $AgSbF_6$).

In addition polymerization or addition copolymerization of norbornene having an ester or acetyl group, excessive catalyst, as much as 1/100 to 1/400 moles of norbornene, has been used. Lipian, et al. reported polymerization of a norbornene-based monomer using a small amount of catalyst (WO 00/20472). However, most of the preferred embodiments refer to polymerization of alkyl norbornene or copolymerization of alkyl norbornene and silyl norbornene. Although Example 117 refers to polymerization of ester norbornene, the initial addition amount of ester norbornene is only 5% of that of butyl norbornene, suggesting that this method is not efficient for polymerization of ester norbornene. Although the content of ester norbornene in the prepared polymer is not presented, it is expected to be very small. Also, polymerization of norbornene having an acetyl group in Example 134 shows only about a 5% polymerization yield, indicating that the catalyst system is inefficient.

In addition, the literature reported by the inventors of WO 00/20472 in 2001 (Sen, et al., Organometallics 2001, Vol. 20, 2802-2812) shows that the polymerization yield of ester norbornene was below 40%, and an excessive amount of catalyst of as much as about 1/400 moles of the amount of the monomer was used.

It is believed that the reason why such a large amount of catalyst should be used is that catalytic activity decreases due to interaction with a polar group of norbornene such as an ester or acetyl group (Sen. et al., Organometallics 2001, Vol. 20, 2802-2812). Specifically, when polymerizing norbornene having an ester or acetyl group, an exo isomer is more stable thermodynamically, but an endo isomer is stabilized kinetically to generate more endo isomers than exo isomers.

This can be explained by interaction of oxygen lone-pair electrons and in $\pi$-orbital of a diene in a Diels-Alder reaction or by steric interaction of a methyl group and an ester group of diene, as shown in the following Scheme 2 and Scheme 3.

Scheme 2 Transition state of an endo isomer

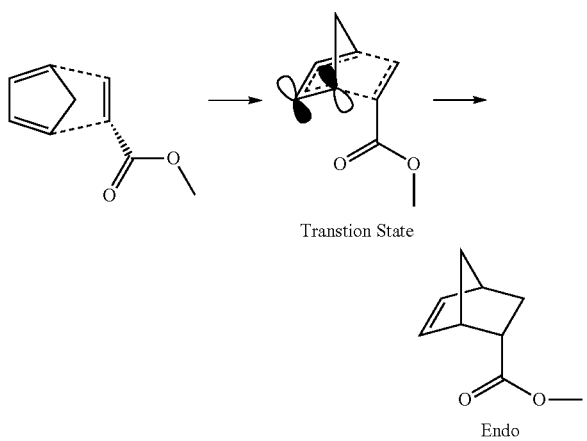

Scheme 3
Transition state of an exo isomer

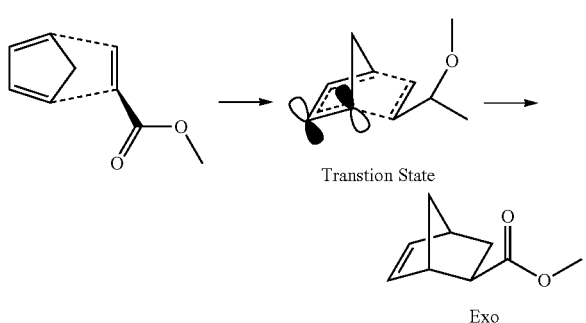

The endo isomer is known to reduce catalytic activity in the subsequent polymerization steps (Risse, et al., Macromolecules, 1996, Vol. 29, 2755-2763; Risse, et al., Makromol, Chem. 1992, Vol. 193, 2915-2927). Therefore, in polymerization of a norbornene monomer having an ester or an acetyl group, it is desirable that more exo isomers exist in the polymerization solution, if possible. Also, a method of introducing a ligand designed to prevent a decrease in polymerization activity in the presence of endo isomers is required.

DISCLOSURE

Technical Problem

It is an object of the present invention to provide a catalyst system capable of preparing a cyclic olefin polymer having a low dielectric constant, low hygroscopicity, a high glass transition temperature, superior thermal stability and oxidative stability, good chemical resistance and toughness, and superior adhesion to metal, a method for preparing a cyclic olefin polymer using the same, and a cyclic olefin polymer prepared by the method.

Technical Solution

In order to achieve these objects, the present invention provides a catalyst system for preparing a cyclic olefin addition polymer which comprises:
a) a Group X transition metal compound;
b) a compound comprising a neutral Group XV electron donor ligand having a cone angle of at least 160°; and
c) a salt capable of offering an anion that can be weakly coordinated to the transition metal of the a) the Group X transition metal compound.

Preferably, said a) the Group X transition metal compound is represented by the following Chemical Formula 1:

$$M(R)_2 \quad \text{[Chemical Formula 1]}$$

wherein
M is a Group X metal; and
R is an $(R')_2N$ or $(R')_2P$ ligand, or an anionic ligand offering σ- and π-bonds such as hydrocarbyl, acetylacetonate ($R''C(O)CHC(O)R''$), or acetate group.

Wherein each of R' and R'' is hydrogen; $C_1$ to $C_{20}$ linear or branched alkyl; $C_2$ to $C_{20}$ linear or branched alkenyl, or vinyl; $C_5$ to $C_{12}$ cycloalkyl substituted with hydrocarbon or unsubstituted; $C_6$ to $C_{40}$ aryl substituted with hydrocarbon or unsubstituted; $C_6$ to $C_{40}$ aryl having hetero atom; $C_7$ to $C_{15}$ aralkyl substituted with hydrocarbon or unsubstituted; or $C_3$ to $C_{20}$ alkynyl. And the functional group may be substituted by at least one substituent selected from the group consisting of alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy and haloaryloxy.

In Chemical Formula 1, preferably R is acetylacetonate ($R''C(O)CHC(O)R''$) or acetate group.

Preferably, said b) the compound comprising a neutral Group XV electron donor ligand having a cone angle of at least 160° is represented by the following Chemical Formula 2 or Chemical Formula 3:

$$P(R^5)_{3-c}[X(R^5)_d]_c \quad \text{[Chemical Formula 2]}$$

wherein
X is oxygen, sulfur, silicon or nitrogen;
c is an integer of 0 to 3;
d is 1 if X is oxygen or sulfur, 3 if X is silicon, and 2 if X is nitrogen;
if c is 3 and X is oxygen, two or three $R^5$ groups may be connected with each other through oxygen to form a cyclic group; and if c is 0, two $R^5$ groups may be connected with each other to form a phosphacycle; and $R^5$ is hydrogen; a $C_1$ to $C_{20}$ linear or branched alkyl; a $C_1$ to $C_{20}$ linear or branched alkoxy; $C_2$ to $C_{20}$ alkyl, alkenyl, or vinyl; a $C_5$ to $C_{12}$ cycloalkyl substituted with hydrocarbon or unsubstituted; a $C_6$ to $C_{40}$ aryl substituted with hydrocarbon or unsubstituted; a $C_7$ to $C_{15}$ aralkyl substituted with hydrocarbon or unsubstituted; a $C_3$ to $C_{20}$ alkynyl; a tri($C_1$ to $C_{10}$ linear or branched alkyl)silyl; a tri($C_1$ to $C_{10}$ linear or branched alkoxy)silyl; a tri($C_5$ to $C_{12}$ cycloalkyl substituted with hydrocarbon or unsubstituted) silyl; a tri($C_6$ to $C_{40}$ aryl substituted with hydrocarbon or unsubstituted) silyl; a tri($C_6$ to $C_{40}$ aryloxy substituted with hydrocarbon or unsubstituted) silyl; a tri($C_1$ to $C_{10}$ linear or branched alkyl)siloxy; or a tri($C_5$ to $C_{12}$ cycloalkyl substituted with hydrocarbon or unsubstituted) siloxy; or a tri($C_6$ to $C_{40}$ aryl substituted with hydrocarbon or unsubstituted) siloxy, wherein each substituent can be further substituted by a linear or branched haloalkyl or halogen; and $$(R^5)_2P-(R^6)-P(R^5)_2 \quad \text{[Chemical Formula 3]}$$

wherein
$R^5$ is the same as defined in Chemical Formula 2; and
$R^6$ is a $C_1$ to $C_5$ linear or branched alkyl; $C_2$ to $C_5$ alkenyl or vinyl;
a $C_5$ to $C_{12}$ cycloalkyl substituted with hydrocarbon or unsubstituted; a $C_6$ to $C_{20}$ aryl substituted with hydrocarbon or unsubstituted; or a $C_7$ to $C_{15}$ aralkyl substituted with hydrocarbon or unsubstituted.

Preferably, said c) the salt capable of offering an anion that can be weakly coordinated to the transition metal of the a) the Group X transition metal compound is represented by the following Chemical Formula 4:

[Cat]$_a$[Anion]$_b$     [Chemical Formula 4]

wherein "Cat" is a cation selected from a group consisting of a hydrogen ion; a cation of a Group I metal, Group II metal, or transition metal; and an organic group comprising the cations, to which the b) neutral Group XV electron donor compound can be weakly bonded;

"Anion", which can be weakly coordinated to the transition metal of the a) the Group X transition metal compound, is selected from a group consisting of borate, aluminate, $SbF_6$, $PF_6$, $AlF_3O_3SCF_3$, $SbF_5SO_3F$, $AsF_6$, perfluoroacetate ($CF_3CO_2$), perfluoropropionate($C_2F_5CO_2$), perfluorobutyrate($CF_3CF_2CF_2CO_2$), perchlorate($ClO_4$), p-toluene sulfonate(p-$CH_3C_6H_4SO_3$), boratabenzene and caborane substituted by hydrocarbon or unsubstituted; and a and b respectively represent the mole ratio of cations and anions, determined for the compound of Chemical Formula 4 so as to satisfy charge neutrality.

Preferably, the organic group comprising a cation in Chemical Formula 4 is selected from a group comprising ammonium such as [NH—($R^7$)$_3$]$^+$ and [N($R^7$)$_4$]$^+$; phosphonium such as [PH($R^7$)$_3$]$^+$ and [P($R^7$)$_4$]$^+$, carbonium such as [C($R^7$)$_3$]$^+$, and silylium such as [Si($R^7$)$_3$]$^+$, wherein $R^7$ is a $C_1$ to $C_{20}$ linear or branched alkyl; alkyl or silyl alkyl substituted with halogen; a $C_5$ to $C_{12}$ cycloalkyl substituted with hydrocarbon or unsubstituted; a cycloalkyl or silyl cycloalkyl substituted with halogen; a $C_6$ to $C_{40}$ aryl substituted with hydrocarbon or unsubstituted; an aryl or silyl aryl substituted with halogen; a $C_7$ to $C_{15}$ aralkyl substituted with hydrocarbon or unsubstituted; or an aralkyl or silyl aralkyl substituted with halogen.

Preferably, the borate or aluminate in Chemical Formula 4 is represented by the following Chemical Formula 5 or Chemical Formula 6:

[M'($R^8$)($R^9$)($R^{10}$)($R^{11}$)]     [Chemical Formula 5]

[M'($OR^{12}$)($OR^{13}$)($OR^{14}$)($OR^{15}$)]     [Chemical Formula 6]

Wherein

M' is boron or aluminum; and each of $R^8$, $R^9$, $R^{10}$, $R^{11}$, $R^{12}$, $R^{13}$, $R^{14}$ and $R^{15}$ is $C_1$ to $C_{20}$ linear or branched alkyl substituted with halogen or unsubstituted; $C_2$ to $C_{20}$ alkenyl substituted with halogen or unsubstituted; $C_5$ to $C_{12}$ cycloalkyl substituted with hydrocarbon or unsubstituted; $C_6$ to $C_{40}$ aryl substituted with hydrocarbon or unsubstituted; $C_7$ to $C_{15}$ aralkyl substituted with hydrocarbon or unsubstituted; $C_3$ to $C_{20}$ alkynyl; $C_3$ to $C_{20}$ linear or branched trialkylsiloxy; or $C_{18}$ to $C_{48}$ linear or branched triarylsiloxy.

The present invention also provides a method for preparing a cyclic olefin addition polymer, which comprises a step of conducting an addition polymerization by contacting a monomer mixture comprising more than 20 mol % and less than 100 mol % of norbornene-based monomer having a polar functional group with a catalyst system comprising:

a) a Group X transition metal compound;
b) a compound comprising a neutral Group XV electron donor ligand having a cone angle of at least 160°; and
c) a salt capable of offering an anion that can be weakly coordinated to the transition metal of the a) the Group X transition metal compound.

Also, the present invention provides cyclic olefin addition polymer comprising more than 20 mol % and less than 100 mol % of norbornene-based monomer having a polar functional group of the following Chemical Formula 7, which is prepared by the above-mentioned method.

[Chemical Formula 7]

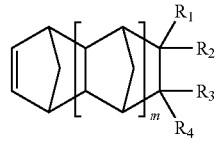

wherein,
m is an integer of 0 to 4;
at least one of the $R_1$, $R_2$, $R_3$, and $R_4$ is each independently a polar functional group consisting of —$R_6OR_6$, —$OR_6$, —$OC(O)OR_6$, —$R_6OC(O)OR_6$, —$C(O)OR_6$, —$R_5C(O)OR_6$, —$C(O)R_6$, —$R_6C(O)R_6$, —$OC(O)R_6$, —$R_5OC(O)R_6$, —($R_5O$)$_p$—$OR_6$, —($OR_5$)$_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_6S(=O)R_6$, —$R_5C(=S)R_6$—, —$R_5C(=S)SR_6$, —$R_5SO_3R_6$, —$SO_3R_6$, —$R_6N=C=S$, —$N=C=S$, —NCO, —$R_5$—NCO, —CN, —$R_6CN$, —$NNC(=S)R_6$, —$R_5NNC(=S)R_6$, —$NO_2$, —$R_5NO_2$,

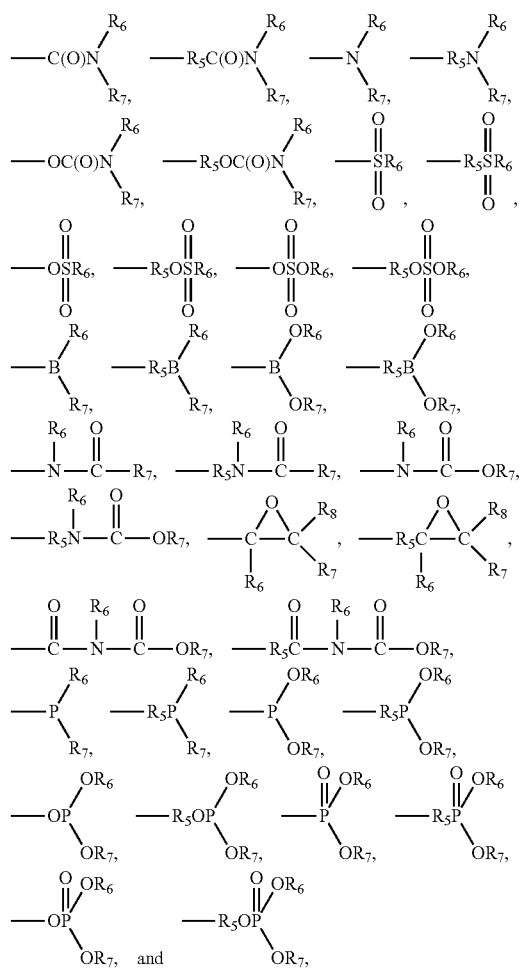

in the polar functional group,
$R_5$s are the same or different from each other, and are each independently $C_1$ to $C_{20}$ linear or branched alkylene; $C_2$ to $C_{20}$ linear or branched alkenylene; $C_3$ to $C_{20}$ linear or branched alkynylene; $C_3$ to $C_{12}$ cycloalkylene; $C_6$ to $C_{40}$ arylene; $C_7$ to $C_{15}$ aralkylene; $C_1$ to $C_{20}$ alkoxylene; or $C_1$ to $C_{20}$ carbonyloxylene and the functional group may be substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy and haloaryloxy, $R_6$, $R_7$, and $R_8$ are the same or different from each other, and are each independently hydrogen; halogen; $C_1$ to $C_{20}$ linear or branched alkyl; $C_2$ to $C_{20}$ linear or branched alkenyl; $C_3$ to $C_{20}$ linear or branched alkynyl; $C_3$ to $C_{12}$ cycloalkyl; $C_6$ to $C_{40}$ aryl; $C_7$ to $C_{15}$ aralkyl; $C_1$ to $C_{20}$ alkoxy; or $C_1$ to $C_{20}$ carbonyloxy and the functional group, except hydrogen and halogen, may be substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy and haloaryloxy and p is an integer of 1 to 10, and except polar functional group, $R_1$, $R_2$, $R_3$, and $R_4$ are each independently hydrogen; halogen; $C_1$ to $C_{20}$ linear or branched alkyl; $C_2$ to $C_{20}$ linear or branched alkenyl, or vinyl; $C_3$ to $C_{20}$ linear or branched alkynyl; $C_3$ to $C_{12}$ cycloalkyl; $C_6$ to $C_{40}$ aryl; $C_7$ to $C_{15}$ aralkyl; and the functional group, except hydrogen, may be substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy and haloaryloxy, with a proviso that $R_1$, $R_2$, $R_3$, and $R_4$ are not hydrogen, halogen, or the polar functional group, $R_1$ and $R_2$, or $R_3$ and $R_4$ may be connected to each other to form a $C_1$ to $C_{10}$ alkylidene group, or $R_1$ or $R_2$ may be connected to any one of $R_3$ and $R_4$ to form a $C_4$ to $C_{12}$ saturated or unsaturated aliphatic ring or an $C_6$ to $C_{24}$ aromatic ring.

Advantageous Effects

The preparation method for a cyclic olefin addition polymer of the present invention comprises using a catalytic system capable of avoiding a decrease of catalytic activity due to an ester or acetyl group of an endo isomer. According to the present invention, superior polymerization result can be obtained with a very small amount of catalyst. An addition polymer of norbornene-based monomer having an ester or acetyl group prepared by the present invention is a cyclic olefin addition polymer which is transparent, has good adhesivity to metal or polymers having other polar groups generates no byproducts when attached to metal, has a low dielectric constant so that it can be used for insulating electronic devices, and has superior thermal stability and mechanical strength.

DESCRIPTION OF DRAWINGS

FIG. 1 is a schematic diagram showing interaction of an endo-norbornene ester and palladium metal.

FIG. 2 is a schematic diagram showing interaction of an exo-norbornene ester and palladium metal.

FIG. 3a is a schematic diagram of a structure wherein both the catalyst and the ester group are in exo positions to norbornene, showing structural stability according to the position of the catalyst and the ester group in case phosphine group does not exist.

FIG. 3b is a schematic diagram of a structure wherein the catalyst is in an exo position but the ester group is in an endo position to norbornene, showing structural stability according to the position of the catalyst and the ester group in case phosphine group does not exist.

FIG. 3c is a schematic diagram of a structure wherein both the catalyst and the ester group are in endo positions to norbornene, showing structural stability according to the position of the catalyst and the ester group in case phosphine group does not exist.

FIG. 4a is a schematic diagram of a structure wherein both the catalyst and the ester group are in exo positions to norbornene, showing structural stability according to the position of the catalyst and the ester group in case a $PH_3$ ligand exists in the catalyst.

FIG. 4b is a schematic diagram of a structure wherein the catalyst is in an exo position but the ester group is in an endo position to norbornene, showing structural stability according to the position of the catalyst and the ester group in case a $PH_3$ ligand exists in the catalyst.

FIG. 4c is a schematic diagram of a structure wherein both the catalyst and the ester group are in endo positions to norbornene, showing structural stability according to the position of the catalyst and the ester group in case a $PH_3$, ligand exists in the catalyst.

FIG. 5a is a schematic diagram of a structure wherein both the catalyst and the ester group are in exo positions to norbornene, showing structural stability according to the position of the catalyst and the ester group in ease a $PPh_3$ ligand exists in the catalyst.

FIG. 5b is a schematic diagram of a structure wherein the catalyst is in an exo position but the ester group is in an endo position to norbornene, showing structural stability according to the position of the catalyst and the ester group in case a $PPh_3$ ligand exists in the catalyst.

FIG. 5c is a schematic diagram of a structure, wherein both the catalyst and the ester group are in endo positions to norbornene, showing structural stability according to the position of the catalyst and the ester group in ease a $PPh_3$ ligand exists in the catalyst.

FIG. 6a is a schematic diagram of a structure wherein both the catalyst and the ester group are in exo positions to norbornene, showing structural stability according to the position of the catalyst and the ester group in case a $P(cyclohexyl)_3$ ligand exists in the catalyst.

FIG. 6b is a schematic diagram of a structure wherein the catalyst is in an exo position but the ester group is in an endo position to norbornene showing structural stability according to the position of the catalyst and the ester group in case a $P(cyclohexyl)_3$ ligand exists in the catalyst.

FIG. 6c is a schematic diagram of a structure wherein both the catalyst and the ester group are in endo positions to norbornene showing structural stability according to the position of the catalyst and the ester group in case a $P(cyclohexyl)_3$ ligand exists in the catalyst.

FIG. 7 is a result of measuring $^{31}P$ NMR of the catalyst system prepared in Example 16 at 25° C., 60° C., 90° C., 110° C. and 120° C.

FIG. 8 is a result of measuring $^{31}P$ NMR of the mixture of the catalyst system prepared in Example 16 and monomer at 25° C., 60° C., 90° C., 110° C. and 120° C.

BEST MODE

Hereinafter, the present invention is described in more detail.

The present inventors have discovered that a cyclic olefin addition polymer having a polar group, which has high molecular weight and high yield regardless of the fact that the monomers are exo- or endo-isomer, can be prepared by an addition polymerization of monomer mixture comprising more than 20 mol % of norbornene-based monomer having polar group in the presence of a catalyst into which a suitable ligand is introduced, and completed the present invention The present invention provides a highly active catalyst system for polymerization of cyclic olefin polymer, which comprises a cocatalyst and a catalyst into which a suitable ligand capable of avoiding catalytic activity deterioration due to the ester group or acetyl group of an endo-isomer is introduced. And, the present invention also provides a method for preparing a cyclic olefin addition polymer comprising norbornene-based monomers having an ester or acetyl group without loss of yield and molecular weight by addition polymerization of norbornene-based monomer mixture having an ester or acetyl group using the above catalyst system, and provides cyclic olefin addition polymer prepared by the method.

The catalyst system of the present invention can polymerize a norbornene-based compound having an ester or acetyl functional group using a much smaller amount of catalyst than that of prior art. Specifically, superior polymerization result can be obtained with a catalyst amount of only 1/2,500 to 1/100,000 based on the weight of the norbornene monomer having an ester or acetyl group.

In case of polymerizing monomer mixture comprising more than 20 mol % of norbornene-based monomer having a functional group of Chemical Formula 7, the yield of polymerization may be more than 30%, and preferably, more than 50%.

With regard to the catalyst system of the present invention, a) a Group X transition metal compound; b) a compound comprising a neutral Group XV electron donor ligand having a cone angle of at least 160°; and c) a salt capable of offering an anion that can be weakly coordinated to the transition metal of the a) the Group X transition metal compound may be in the mixture of multi component by existing respectively or by reacting each other to form at least two kinds of complex. Accordingly, the catalyst system in multi component system may make catalyst preparation process to be simplified or omitted in comparison with the single component catalyst system.

In the catalyst system of the present invention, the multi component catalyst system may comprise the complex of the following Chemical Formula 8, which is formed the catalyst components by combination in polymerization;

 [Chemical Formula 8]

Wherein R and M are the same as defined in Chemical Formula 1, x is 0, 1 or 2;

A is a compound comprising a neutral Group XV electron donor ligand having a cone angle of at least 160°, y is 1 or 2;

B is a solvent, diluent or a monomer used in polymerization, z is 0, 1 or 2;

x+y+z=3;

D is an anion in the salts of the c);

a and b respectively represent the mole ratio of $[R_xMA_yB_z]$ and D, determined for the complex so as to satisfy charge neutrality.

In Chemical Formula 8, it should come into the spotlight that x+y+z is 3. That is, if the complex comprises more than one neutral Group XV electron donor ligand having a cone angle of at least 160°, it result in steric effect, and if the substituent of the neutral Group XV electron donor ligand can transport electrons to the Group XV atom sufficiently, the catalyst system can be formed in x+y+z=3. Accordingly, the interaction core metal in catalyst component with oxygen and moisture in atmosphere may be reduced, and it can increase the energy against the catalyst deactivation.

In the present invention, components may be mixed in a solvent to prepare an activated catalyst solution to be used its polymerization, or they may be added respectively in a polymerization solution.

In the present invention, it is preferable to use solution polymerization method in polymerization with the components. The solution polymerization is advantageous in polymer preparation to easily control exothermic reaction, the molecular weight of polymer and microstructure of polymer, etc.

The cyclic olefin addition polymer of the present invention, which is prepared by the above-mentioned catalyst system, may comprise more than 20 mol % and less than 100 mol % of norbornene-based monomer having a polar functional group of Chemical Formula 7, and preferably, comprise 30 mol % to 100 mol %.

It may be used one or at least two kinds of the norbornene-based monomer having a polar functional group of Chemical Formula 7. In Chemical Formula 7, the polar functional group is, preferably, ester or acetyl group. In the present invention, high yield and molecular weight can be accomplished by using the norbornene-based monomer having a polar functional group of Chemical Formula 7 in spite of comprising endo-isomers as mentioned above, but the yield and molecular weight can be more enhanced in case of comprising more than 50 mol % of exo-isomers.

The cyclic olefin addition polymer may comprise more than 0 mol % and less than 80 mol % of at least one monomer selected from the group consisting of a norbornene-based monomer having a non-polar functional group and a norbornene-based monomer having a polar functional group that is not defined in Chemical Formula 7.

The non-polar functional group which can be combined with the norbornene-based monomer having a non-polar functional group may be hydrogen; halogen; $C_1$ to $C_{20}$ linear or branched alkyl; $C_2$ to $C_{20}$ linear or branched alkenyl, or vinyl; $C_3$ to $C_{20}$ linear or branched alkynyl; $C_3$ to $C_{12}$ cycloalkyl; $C_6$ to $C_{40}$ aryl; or $C_7$ to $C_{15}$ aralkyl; and the functional group, except hydrogen, may be substituted by at least one substituent selected from the group consisting of halogen, alkyl, alkenyl, alkynyl, haloalkyl, haloalkenyl, haloalkynyl, aryl, haloaryl, aralkyl and haloaralkyl.

In the present invention, a norbornene-hased monomer means norborene or norbornene derivative and specifically refers to a monomer having at least one norbornene (bicyclo [2,2,1]hept-2-ene) unit, which is represented by the following Chemical Formula 9.

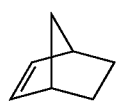 [Chemical Formula 9]

The cyclic olefin addition polymer of the present invention may be prepared by polymerizing a monomer mixture comprising more than 20 mol % and less than 100 mol % of at least one norbornene-based monomer having a polar functional group of Chemical Formula 7 under the above-mentioned catalyst system. As in the conventional polymerization process, the preparation method of the present invention comprise that the monomers and catalyst are mixed in a solvent, and the reaction mixture is polymerized. And, the norbornene-based monomers having a polar functional group such as ester and acetyl group are used without separating endo- or exo-isomers.

Specifically, the present invention provides the method for addition polymerization of norbornene-based monomer having a polar functional group of Chemical Formula 7 under the catalyst system with high activity, wherein some ligands are introduced to avoid reduction of catalyst activity due to a polar functional group such as ester or acetyl group of endo-isomers.

A DFT(density functional theory) calculation theory shows that the catalyst is much more stable when the polar group such as an ester is in the endo position of norbornene as shown in FIG. 1 than when it is in the exo position as shown in FIG. 2, due to a chelating effect of oxygen atoms of the ester on palladium (−17.4 Kcal/mol).

Accordingly, it is difficult for another norbornene monomer having a polar functional group to approach the stabilized catalyst, and therefore a decrease in polymerization activity is inevitable. However, if a phosphine having an adequate size is introduced, a decrease in catalytic activity due to an endo-ester norbornene monomer can be avoided which can be seen from calculation of DFT.

FIG. 3a, FIG. 3b, and FIG. 3c compare structural stability according to position of the catalyst and the ester group in case phosphine group does not exist. FIG. 3a shows the structure wherein both the catalyst and the ester group are in the exo position to norbornene, FIG. 3b shows the structure wherein, the catalyst is in the exo position but the ester group is in the endo position to norbornene, and FIG. 3c shows the structure wherein both the catalyst and the ester group are in the endo position to norbornene. Among the three structures, the structure of FIG. 3a is unstable by about 17.4 kcal/mol compared to the structure of FIG. 3c, and the structure of FIG. 3b is unstable by about 18.3 kcal/mol compared to the structure of FIG. 3c. Therefore, the structure having both the catalyst and the ester group in the endo position to norbornene is the most stable, anti it is expected that the endo isomer will reduce polymerization activity.

When a phosphine ligand is introduced into the catalyst, stability of the catalyst changes significantly according to the size of phosphine ligand. FIG. 4a, FIG. 4b, and FIG. 4c compare structural stability according to position of the catalyst and the ester group in case a $PH_3$ ligand exists in the catalyst. FIG. 4a shows the structure wherein both the catalyst and the ester group are in the exo position to norbornene, FIG. 4b shows the structure wherein the catalyst is in the exo position but the ester group is in the endo position to norbornene, and FIG. 4c shows the structure wherein both the catalyst and the ester group are in the endo position to norbornene. Among the three structures, the structure of FIG. 4a is unstable by about 6.6 kcal/mol compared to the structure of FIG. 4c, and the structure of FIG. 4b is unstable by about 4.83 kcal/mol compared to the structure of FIG. 4c. Therefore, the structure having both the catalyst and the ester group in the endo position to norbornene is the most stable, and a decrease in polymerization activity due to the endo isomer is inevitable. Although the relative difference in stability is smaller for a phosphine ligand having a small cone angle, such as $PH_3$, the endo structure is still the most stable.

The relative difference in stability decreases as the cone angle of the phosphine ligand increases. For $PPh_3$, the relative stability decreases significantly.

For another example, FIG. 5a, FIG. 5b, and FIG. 5c compare structural stability according to the position of the catalyst and the ester group in case a $PPh_3$ ligand exists in the catalyst. FIG. 5a shows the structure wherein both the catalyst and the ester group are in the exo position to norbornene, FIG. 5b shows the structure wherein the catalyst is in the exo position but the ester group is in the endo position to norbornene, and FIG. 5c shows the structure wherein both the catalyst and the ester group are in the endo position to norbornene. Among the three structures, the structure of FIG. 5a is unstable by about 5.44 kcal/mol compared to the structure of FIG. 5c, and the structure of FIG. 5b is unstable by about 4.62 kcal/mol compared to the structure of FIG. 5c. Therefore, the structure having both the catalyst and the ester group in the endo position to norbornene is the most stable, and a decrease of polymerization activity due to the endo isomer is inevitable.

However, the relative stability changes if the cone angle of the phosphine ligand is larger than 160°, as in P(cyclohexyl)$_3$. FIG. 6a, FIG. 6b and FIG. 6c compare structural stability according to the position of the catalyst and the ester group in case a P(cyclohexyl)$_3$ ligand (cone angle=180°) exists in the catalyst. FIG. 6a shows the structure wherein both the catalyst and the ester group are in the exo position to norbornene, FIG. 6b shows the structure wherein the catalyst is in the exo position but the ester group is in the endo position to norbornene, and FIG. 6c shows the structure wherein both the catalyst and the ester group are in the endo position to norbornene. Among the three structures, the structure of FIG. 6a is stable by about 1.61 kcal/mol compared to the structure of FIG. 6c, and the structure of FIG. 6b is unstable by about 1.41 kcal/mol compared to the structure of FIG. 6c. Therefore, the structure having both the catalyst and the ester group in the endo position to norbornene is not stabilized and a decrease of polymerization activity due to the endo isomer is prevented.

Accordingly, when a ligand having a large cone angle, such as a phosphine is introduced in the catalyst, a decrease in catalytic activity due to the endo isomer can be avoided, and catalyst with improved activity can be designed. This catalytic activity improvement effect also be seen to an anionic ligand offering σ- and π-bonding, such as acetylacetonate or acetate, as well as in an allyl ligand, which is bonded to palladium.

With regard to catalytic activity, a catalytic system comprising Palladium(II) acetylacetonate(Pd(acac)$_2$), or Palladium(II) acetate (Pd(acetate)$_2$), dimethylanilinium tetrakis (pentafluorophenyborate) and tricyclohexylphosphine is more effective than a catalyst system comprising [(allyl)Pd (Cl)]$_2$, borate, and phosphine, as will be shown in the Examples. The reason is believed that the acetylacetonate group is easily released from palladium to form a large space around the palladium, so a large norbornene monomer can access easily.

In the present invention, when polymerizing a monomer mixture comprising more than 20 mol % and less than 100 mol % of norbornene-based monomer having a polar functional group of Chemical Formula 7, preferably, the catalyst system comprises: i) 1 mol of the Group X transition metal compound; ii) 1 to 3 mols of the compound comprising a neutral Group XV electron donor ligand having a cone angle of at least 160°; and iii) 1 to 2 mols of the salt capable of offering an anion that can be weakly coordinated to the transition metal of the i) Group X transition metal compound.

Preferably, the catalyst system is used in an amount of 1/2,500 to 1/100,000 based on the weight of the monomer mixture comprising more than 20 mol % and less than 100 mol % of norbornene-based monomer having a polar functional group of Chemical Formula 7, for polymerization of the monomer mixture.

Preferably, polymerization of the present invention is carried at a temperature range of −100° C. to 200° C., more preferably at −60° C. to 150° C., and most preferably at −10° C. to 150° C. The polymerization solvent is preferably selected from those having a boiling point higher than the polymerization temperature.

Preferably, the molecular weight (Mn) of the polymer of the present invention is in the range of 20,000 to 1,000,000.

The cyclic olefin addition polymer comprising more than 20 mol % and less than 100 mol % of norbornene-based monomer having a polar functional group of Chemical Formula 7, which is prepared by the preparation method of the present invention, does not generate by-products because the polar functional group is directly attached to metal.

The conventional polycyclic compounds having silyl groups are attached to metal to generate water or alcohol (e.g. ethanol) by-product, which are not completely removed during process to decrease dielectric constant or corrode metals. However, the cyclic olefin addition polymer having a polar functional group such as an ester or acetyl group of the present invention does not generate by-products when attached to metal, and rather it is strongly attached to metal, therefore there is no concern of increase in dielectric constant or corrosion of metals.

Accordingly, the cyclic olefin addition polymer of the present invention has a low dielectric constant and hygroscopicity, a high glass transition temperature, superior thermal stability and oxidative stability, good chemical resistance and toughness, and superior adhesion to metal. And it can be used as a protection film of polarizer due to excellent optical properties. Also, it can be attached to a substrate for electronic devices without a coupling agent. Since it is attached to a copper, silver, or gold substrate very well, it can be used for a low dielectric coating agent or film comprising electronic devices such as integrated circuits and multichip modules.

Mode for Invention

Hereinafter, the present invention is described in more detail through Examples. However, the following Examples are only for the understanding of the present invention, and the present invention is not limited by the following Examples.

EXAMPLES

All procedures treating compounds sensitive to air or water were carried out by the standard Schlenk technique or using a dry box. Nuclear magnetic resonance (NMR) spectrums were obtained using a Bruker 300 spectrometer. $^1$H NMR was measured at 300 MHz and $^{13}$C NMR was measured. at 75 MHz. Molecular weight and molecular weight distribution of polymers were measured by GPC (gel permeation chromatography) using a polystyrene sample as a standard. Thermal analysis, such as TGA and DSC, was carried out using a TA Instrument (TGA 2050; heating rate=10 K/min).

Toluene was purified by distillation in potassium/benzophenone, and $CH_2Cl_2$ was purified by distillation in $CaH_2$.

The BLYP(Becke-Lee-Yang-Parr)$_2$ functional (Becke, *Phys. Rev. A.,* 1988 Vol. 38, 3098; Lee et al., *Phys. Rev. B.,* 1988, Vol. 37, 785) was employed to calculate various isomers of complex of Pd and norbornene among DFT(Density Functional Theory) method (Hohenberg, et al., *Phys. Rev. B.,* 1964, Vol. 136, 864; Kohn et al., *J. Phys. Rev. A.,* 1965, Vol. 140, 1133), using the Dmo133-4 package of DFT code as a program (Delley, *J. Chem. Phys.* 1990, Vol. 92, 508; *J. Quant. Chem.* 1998, Vol. 69, 423).

For the Basis set, DND (Double Numerical plus d-functions) was used except Pd, and ECP (Effective Core Potential) 5-6 (Doig et al., *J. Chem. Phys.* 1987, Vol. 86, 866; Bergner et al., *mol. Phys.* 1993, Vol. 80, 1431) was used for showing core of Pd atom.

No structural constraint was given in GO (geometry optimization) for calculating the minimum energy of isomers. Because every system has an OS (open shell) with a +1 charge and a doublet, SUOS WF (spin-unrestricted open shell wave function) was used for calculation.

A medium grid was used for numerical integration, and thermal smearing algorithm of the 0.005 hartree was applied for quick SCF convergence. In SCF, the density convergence criterion was set at $1 \times 10^{-5}$. In structure optimization, energy convergence and gradient convergence criterion were set at $2 \times 10^{-5}$ and $4 \times 10^{-5}$ respectively.

Preparation Example 1

Synthesis of Exo-rich Norbornene Carhoxylic Acid Methyl Ester

DCPD (dicyclopentadiene, Aldrich, 256.5 ml, 1.9 mol), methylacrylate (Aldrich 405 ml, 4.5 mol), and hydroquinone (3.2 g, 0.03 mol) were put in a 2 L autoclave. After heating to 180° C., reaction was carried out for 6 hours while stirring at 300 rpm. After the reaction was completed, the reaction mixture was cooled down and transferred to a distillation unit. The reaction mixture was distilled at 1 torr using a vacuum pump at 50° C. to obtain the product (yield: 86%). The mole ratio (mol %) of exo-isomers to endo-isomers of the product was 52:48.

$^1$H-NMR (600 MHz, CDCl$_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

$^{13}$C-NMR (600 Mhz, CDCl$_3$), endo: δ 29.10 (CH$_2$), 42.39 (CH), 43.03 (CH), 45.52 (CH), 49.47 (CH$_2$), 51.28 (CH$_3$), 132.23 (CH), 137.56 (CH), 175.02 (C); exo: δ 30.20 (CH$_2$), 41.49 (CH), 42.83 (CH), 46.21 (CH$_2$), 46.43 (CH), 51.53 (CH$_3$), 135.59 (CH), 139.90 (CH), 176.52 (C).

Preparation Example 2

Synthesis of Endo-rich Norbornene Carboxylic Acid Methylester

DCPD (dicyclopentadiene, Aldrich, 256.5 ml 1.9 mol), methylacrylate (Aldrich 405 ml, 4.5 mol), and hydroquinone (3.2 g, 0.03 mol) were put in a 2 L autoclave. After heating to 180° C., reaction was carried out for 5 hours while stirring at 300 rpm. After the reaction was completed, the reaction mixture was cooled down and transferred to a distillation unit. The reaction mixture was distilled at 1 torr using a vacuum pump at 50° C. to obtain the product (yield: 85%). The mole ratio (mol %) of exo-isomers to endo-isomers of the product was 41.1:58.9.

$^1$H-NMR (600 MHz, CDCl$_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

$^{13}$C-NMR (600 Mhz, CDCl$_3$), endo: δ 29.10 (CH$_2$), 42.39 (CH), 43.03 (CH), 45.52 (CH), 49.47 (CH$_2$), 51.28 (CH$_3$), 132.23 (CH), 137.56 (CH), 175.02 (C); exo: δ 30.20 (CH$_2$), 41.49 (CH), 42.83 (CH), 46.21 (CH$_2$), 46.43 (CH), 51.53 (CH$_3$), 135.59 (CH), 139.90 (CH), 176.52 (C).

Preparation Example 3

Synthesis of Exo-Rich Norbornene Carboxylic Acid Butyl Ester

DCPD (dicyclopentadiene, Aldrich, 180 ml, 1.34 mol), butylacrylate (JUNSEI, 500 ml, 3.49 mol), and hydroquinone (2.7 g, 0.025 mol) were put in a 2 L autoclave. After heating to 190° C., reaction was carried out for 5 hours while stirring at 300 rpm. After the reaction was completed, the reaction mixture was cooled down and transferred to a distillation unit. The reaction mixture was distilled at 1 torr using a vacuum pump at 80° C. to obtain the product (yield: 78%). The mole ratio of exo-isomers to endo-isomers of the product was 56.2:43.8.

$^1$H-NMR (600 MHz, CDCl$_3$), endo: δ 6.17 (dd, 1H), 5.86 (dd, 1H), 3.97 (t, 2H), 3.15 (b, 1H), 2.88 (m, 1H), 2.85 (b, 1H), 1.86 (m, 1H), 1.57 (m, 2H), 1.35 (m, 4H), 1.21 (m, 1H), 0.89 (t, 3H); exo: δ 6.09 (m, 2H), 4.05 (t, 2H), 2.98 (b, 1H), 2.86 (b, 1H), 2.20 (m, 1H), 1.88 (m, 1H), 1.58 (m, 2H), 1.50 (d, 1H), 1.34 (m, 4H), 0.89 (t, 3H).

$^{13}$C-NMR (600 Mhz, CDCl$_3$), endo: δ 13.57 (CH$_3$), 19.04 (CH$_2$), 29.00 (CH$_2$), 30.63 (CH$_2$), 42.39 (CH), 43.20 (CH), 45.56 (CH), 49.45 (CH$_2$), 63.83 (CH$_2$), 132.31 (CH), 137.50 (CH), 174.05 (C); exo: δ 13.57 (CH$_3$), 19.04 (CH$_2$), 30.14 (CH$_2$), 30.63 (CH$_2$), 41.48 (CH), 43.04 (CH), 46.19 (CH$_2$), 46.48 (CH), 64.07 (CH$_2$), 135.61 (CH), 137.84 (CH), 176.05 (C).

Preparation Example 4

Synthesis of Endo-Rich Allylacetate Norbornene

DCPD (dicyclopentadiene, Aldrich, 248 ml, 1.852 mol), allylacetate (Aldrich, 500 ml, 4.63 mol), and hydroquinone (0.7 g, 0.006 mol) were put in a 2 L autoclave. After heating to 180° C., reaction was carried out for 5 hours while stirring at 300 rpm. After the reaction was completed, the reaction mixture was cooled down and transferred to a distillation unit. The reaction mixture was distilled twice at 1 torr using a vacuum pump at 56° C. to obtain the product (yield: 30%). The mole ratio of exo-isomers to endo-isomers of the product was 17:83.

$^1$H-NMR (300 MHz, CDCl$_3$): δ 6.17-5.91 (m, 2H), 4.15-3.63 (m, 2H), 2.91-2.88 (m, 2H), 2.38 (m, 1H), 2.05 (s, 3H), 1.83 (m, 1H), 1.60-1.25 (m, 2H), 0.57 (m, 1H)

Example 1

Preparation of Norbornene Carboxylic Acid Methyl Ester Addition Homopolymer Using Tricyclohexylphosphine and Pd(acac)$_2$ as a Catalyst 10 g (65.7 mmol) of exo-rich norbornene carboxylic acid methyl ester synthesized in Preparation Example 1 and 15 ml of purified toluene were introduced into a 250 ml Schlenk flask, as a monomer and a solvent, respectively. Then, 2.0 mg of palladium (II) acetylacetonate(Pd(acac)$_2$) and 1.84 mg of tricyclohexyl phosphine dissolved in 5 ml of toluene as catalysts, and 10.6 mg of dimethylanilinium tetrakis(pentafluorophenyl) borate dissolved in 2 ml of CH$_2$Cl$_2$ as a cocatalyst were introduced into the flask, and the reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 3.34 g of norbornene carboxylic acid methyl ester homopolymer (yield: 33.4 wt % of total monomer input). Number average molecular weight (Mn) of the polymer was 31,700, and weight average molecular weight (Mw) of the polymer was 71,400.

Example 2

Preparation of Norbornene Carboxylic Acid Butyl Ester Addition Homopolymer Using Tricyclohexyl Phosphine and Pd(acac)$_2$ as a Catalyst 10 g (51.47 mmol) of exo-rich norbornene carboxylic acid butyl ester prepared in Preparation Example 3 as a monomer and 5 ml of purified toluene as a solvent were introduced into a 250 ml Schlenk flask. Then, 3.14 mg of palladium (II) acetylacetonate and 2.89 mg of tricyclohexyl phosphine dissolved in 5 ml of toluene as catalysts and 16.5 mg of dimethylanilinium tetrakis(pentafluorophenyl)borate dissolved in 2 ml of CH$_2$Cl$_2$ as a cocatalyst were added to the flask. Then reaction was carried out at 90° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 4.83 g of norbornene carboxylic acid butyl ester homopolymer (yield: 48.3 wt % of total monomer input). Number average molecular weight (Mn) of the polymer was 45,000, and weight average molecular weight (Mw) of the polymer was 84,000.

Comparative Example 1

Preparation of Norbornene Carhoxylic Acid Methyl Ester Addition Homopolymer Using Triphenyl Phosphine and Pd(acac)$_2$ as a Catalyst 5 g (32.90 mmol) of the exo-rich norbornene carboxylic acid methyl ester prepared in the Preparation Example 1 as a monomer and 5 ml of purified toluene as a solvent were introduced into 250 ml Schenk flask. To the flask 1.00 mg of Pd(acac)$_2$ and 0.92 mg of triphenyl phosphine dissolved in 5 ml of toluene as catalysts, and 5.26 mg of dimethylanilinium tetrakis(pentafluorophenyl)borate dissolved in 2 ml of CH$_2$Cl$_2$ as a cocatalyst were introduced. Then, reaction was carried out at 90° C. for 18 hours while stirring.

After the reaction was completed, the reaction mixture was added to excess ethanol. However, copolymer precipitate could not be obtained.

Example 3

Preparation of Norbornene Carboxylic Acid Methyl Ester Addition Homopolymer Using Tricyclohexyl Phosphine and Pd(acac)$_2$ as a Catalyst 10.46 g (68.7 mmol) of exo-rich norbornene carboxylic acid methyl ester synthesized in Preparation Example 2 and 20 ml of purified toluene as a solvent were put into a 250 in Schlenk flask, as monomer and solvent, respectively.

Then, 1.54 mg of Pd(acac)$_2$ and 1.93 mg of tricyclohexyl phosphine dissolved in 5 ml of toluene as catalysts and 11.01 mg of dimethylanilinium tetrakis(pentafluorophenyl)borate dissolved in 2 ml of CH$_2$Cl$_2$ as a cocatalyst were added to the flask. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 3.33 g of norbornene carboxylic acid methyl ester homopolymer (yield: 31.8 wt % of total monomer input). Number average molecular weight (Mn) of the polymer was 27,500, and weight average molecular weight (Mw) of the polymer was 78,300.

Example 4

Preparation of Addition Copolymer of Norbornene Carboxylic Acid Methylester/Norbornene Using Tricyclohexyl Phosphine and Pd(acac)$_2$ as a Catalyst Into a 250 ml Schlenk flask, 16.74 g (110.0 mmol) of exo-rich norbornene carboxylic acid methyl ester prepared in Preparation Example 1 and 4.44 g (47.13 mmol) of norbornene as monomers, and 37 ml of purified toluene as a solvent were introduced. Into the flask, 4.79 mg of Pd(acac)$_2$ and 4.41 mg of tricyclohexyl phosphine dissolved in 5 ml of toluene as catalysts, and 25.2 mg of dimethylanilinium tetrakis(pentafluorophenyl)borate dissolved in 2 ml of CH$_2$Cl$_2$ as a cocatalyst were added. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 12.96 g of copolymer of norbornene and norbornene carboxylic acid methyl ester (yield: 61.2 wt % of total monomer input). Number average molecular weight (Mn) of the polymer was 81,000, and weight average molecular weight (Mw) of the polymer was 164,000.

Example 5

Preparation of Addition Copolymer of Norbornene Carboxylic Acid Methylester/Butyl Norbornene Using Tricyclohexyl Phosphine and Pd(acac)$_2$ as a Catalyst Into a 250 in Schlenk flask, 10.46 g (68.73 mmol) of exo-rich norbornene carboxylic acid methyl ester prepared in Preparation Example 1 and 10.24 g (6.73 mmol) of butyl norbornene as monomers, and 39 ml of purified toluene as a solvent were introduced. Into the flask, 4.17 mg of Pd(acac)$_2$ and 3.86 mg of tricyclohexyl phosphine dissolved in 5 ml of toluene as catalysts, and 22.1 mg of dimethylanilinium tetrakis(pentafluorophenyl)borate dissolved in 2 ml of CH$_2$Cl$_2$ as a cocatalyst were added. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 15.15 g of copolymer of butyl norbornene and norbornene carboxylic acid methyl ester (yield: 73.2 wt % of total monomer input). Number average molecular weight (Mn) of the polymer was 62,000, and weight average molecular weight (Mw) of the polymer was 140,000.

Example 6

Preparation of Addition Copolymer of Norbornene Carboxylic Acid Methylester/Hexyl Norbornene Using Tricyclohexyl Phosphine and Pd(acac)$_2$ as a Catalyst Into a 250 ml Schlenk flask, 9.41 g (61.85 mmol) of exo-rich norbornene carboxylic acid methyl ester prepared in Preparation Example 1 and 11.03 g (61.85 mmol) of hexyl norbornene as monomers, and 39 ml of purified toluene as a solvent were introduced. Into the flask, 3.8 mg of Pd(acac)$_2$ and 3.5 mg of tricyclohexyl phosphine dissolved in 5 ml of toluene as catalysts, and 20.8 mg of dimethylanilinium tetrakis(pentafluorophenyl)borate dissolved in 2 in of CH$_2$Cl$_2$ as a cocatalyst were added. Then, reaction was carried out at 90° C. for 18 hours while stirring.

After the reaction was completed, the reaction mixture was introduced to excess ethanol to obtain a white copolymer precipitate. The precipitate was filtered with a glass funnel and dried in a vacuum oven at 65° C. for 24 hours to obtain 16.02 g of copolymer of hexyl norbornene and norbornene carboxylic acid methyl ester (yield: 78.4 wt % of total monomer input). Number average molecular weight (Mn) of the polymer was 50,000, and weight average molecular weight (Mw) of the polymer was 136,000.

Example 7

Preparation of Norbornene Carboxylic Acid Butyl Ester Addition Homopolymer Using Tricyclohexyl Phosphine and Pd(acac)$_2$ as a Catalyst 40 g (205.9 mmol) of exo-rich norbornene carboxylic acid butyl ester prepared in Preparation Example 3 as monomers and 70 ml of purified toluene as a solvent were introduced into a 250 ml Schlenk flask. Then, 12.5 mg of Pd(acac)$_2$ and 11.6 mg of tricyclohexyl phosphine dissolved in 10 ml of toluene as catalysts and 66.0 mg of dimethylanilinium tetrakis(pentafluorophenyl)borate dissolved in 5 in of CH$_2$Cl$_2$ were added to the flask as a cocatalyst. Then, reaction was carried out at 80° C. for 90 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 29.9 g of norbornene carboxylic acid butyl ester homopolymer (yield: 74.8 wt % of total monomer input). Number average molecular weight (Mn) of the polymer was 47,000, and weight average molecular weight (Mw) of the polymer was 92,000.

Example 8

Preparation of Norbornene Carboxylic Acid Butyl Ester Addition Homopolymer Using Tricyclohexyl Phosphine and Pd(acac)$_2$ as a Catalyst 100 g (514.7 mmol) of exo-rich norbornene carboxylic acid butyl ester prepared in Preparation Example 3 as a monomer and 180 ml of purified toluene as a solvent were introduced into a 250 ml Schlenk flask. Then, 32.36 mg of Pd(acac)$_2$ and 28.86 mg of tricyclohexyl phosphine dissolved in 20 ml of toluene as catalysts and 164.9 mg of dimethylanilinium tetrakis(pentafluorophenyl)borate dissolved in 10 ml of $CH_2Cl_2$ as a cocatalyst were added to the flask. Then, reaction was carried out at 80° C. for 90 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 73.7 g of norbornene carboxylic acid butyl ester homopolymer (yield: 73.7 wt % of total monomer input). Number average molecular weight (Mn) of the polymer was 47,200, and weight average molecular weight (Mw) of the polymer was 91,800.

Example 9

Preparation of Addition Copolymer of Norborene/Norbornene Carboxylic Acid Butylester Using Tricyclohexyl Phosphine and $Pd(acac)_2$ as a Catalyst Into a 250 ml Schlenk flask, 10 g (51.47 mmol) of exo-rich norbornene carboxylic acid butyl ester prepared in Preparation Example 3 and 4.85 g (51.47 mmol) of norbornene as monomers, and 25 ml of purified toluene as solvent were introduced. To the flask, 6.27 mg of $Pd(acac)_2$ and 5.77 mg of tricyclohexyl phosphine dissolved in 5 ml of toluene as catalysts, and 33.0 mg of dimethylanilinium tetrakis(pentafluorophenyl)borate dissolved in 2 ml of $CH_2Cl_2$ as a cocatalyst were added. Then, reaction was carried out at 80° C. for 17 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 10.14 g of copolymer of norbornene and norbornene carboxylic acid butyl ester (yield: 68.3 wt % of total monomer input). Number average molecular weight (Mn) of the polymer was 126,000, and weight average molecular weight (Mw) of the polymer was 266,000.

Example 10

Preparation of Addition Copolymer of Norbornene Carboxylic Acid Butylester/Butyl Norborene Using Tricyclohexyl Phosphine and $Pd(acac)_2$ as a Catalyst Into a 250 ml Schlenk flask, 15.55 g (80.0 mmol) of exo-rich norbornene carboxylic acid butyl ester prepared in Preparation Example 3 and 11.93 g (80.0 mmol) of butyl norbornene as monomers, and 55 ml of purified toluene as a solvent were introduced. To the flask, 4.9 mg of $Pd(acac)_2$ and 4.5 mg of tricyclohexyl phosphine dissolved in 5 ml of toluene as catalysts, and 25.6 mg of dimethylanilinium tetrakis (pentafluorophenyl)borate dissolved in 2 ml of $CH_2Cl_2$ as a cocatalyst were added. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 18.1 g of copolymer of butyl norbornene and norbornene carboxylic acid butyl ester (yield: 65.9 wt % of total monomer input). Number average molecular weight (Mn) of the polymer was 56,000, and weight average molecular weight (Mw) of the polymer was 132,000.

Example 11

Preparation of Norbornene Carboxylic Acid Butyl Ester Addition Homopolymer Using endo isomers only and using Tricyclohexyl Phosphine and $Pd(acac)_2$ as a Catalyst Into a 250 ml Schlenk flask, 5.0 g (25.73 mmol) of norbornene carboxylic acid butyl ester endo isomers as monomers and 9 ml of purified toluene as a solvent were introduced. To the flask, 7.84 mg of $Pd(acac)_2$ and 7.22 mg of tricyclohexyl phosphine dissolved in 1 ml of toluene as catalysts, and 41.2 mg of dimethylanilinium tetrakis(pentafluorophenyl)borate dissolved in 1 mg of $CH_2Cl_2$ were added. Then reaction was carried out at 80° C. for 90 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 2.57 g of norbornene carboxylic acid butyl ester homopolymer (yield: 51.4 wt % of total monomer input). Number average molecular weight (Mn) of the polymer was 31,000, and weight average molecular weight (Mw) of the polymer was 81,000.

Example 12

Preparation of Norbornene Carboxylic Acid Butyl Ester Addition Homopolymer Using Exo Isomers Only and Using Tricyclohexyl Phosphine and $Pd(acac)_2$ as a Catalyst Into a 250 ml Schlenk flask, 2.7 g (13.90 mmol) of norbornene carboxylic acid butyl ester exo isomers as monomers and 4.6 ml of purified toluene as a solvent were introduced. To the flask, 8.47 mg of $Pd(acac)_2$ and 7.8 mg of tricyclohexyl phosphine dissolved in 1 ml of toluene as catalysts and 44.5 mg of dimethylanilinium tetrakis(pentafluorophenyl)borate dissolved in 1 ml of $CH_2Cl_2$ as a cocatalyst were added. Then reaction was carried out at 80° C. for 2 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 1.53 g of norbornene carboxylic acid butyl ester homopolymer (yield: 56.7 wt % of total monomer input). Number average molecular weight (Mn) of the polymer was 52,000, and weight average molecular weight (Mw) of the polymer was 97,000.

Example 13

Preparation of Addition Copolymer of Norbornene Carboxylic Acid Methylester/Norbornene Carboxylic Acid Butylester Using Tricyclohexyl Phosphine and $Pd(acac)_2$ as a Catalyst Into a 500 ml Schlenk flask, 63.8 g (328.5 mmol) of exo-rich norbornene carboxylic acid butyl ester prepared in Preparation Example 3 and 50.0 g (328.5 mmol) of exo-rich norbornene carboxylic acid methyl ester prepared in Preparation Example 1 as monomers, and 210 ml of purified toluene as a solvent were introduced. Into the flask, 40.0 mg of $Pd(acac)_2$ and 36.9 mg of tricyclohexyl phosphine dissolved in 20 ml of toluene as catalysts, and 210.6 mg of dimethylanilinium tetrakis(pentafluorophenyl)borate dissolved in 10 ml of $CH_2Cl_2$ as a cocatalyst were introduced. Then, reaction was carried out at 80° C. for 90 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 89.94 g of copolymer of norbornene carboxylic acid butyl ester and norbornene carboxylic acid methyl ester (yield: 79.0 wt % of total monomer input). Number average molecular weight (Mn) of the polymer was 50,000, and weight average molecular weight (Mw) of the polymer was 97,000.

Example 14

Preparation of 5-Norbornene-2-yl Acetate Addition Homopolymer Using Tricyclohexyl Phosphine and Pd(acac)$_2$ as a Catalyst Into a 250 ml Schlenk flask, 5 g (32.85 mmol) of exo-rich 5-norbornene-2-yl acetate (containing 88 mol % of exo) as a monomer and 9 ml of purified toluene as a solvent were introduced. Into the flask, 20.6 mg of Pd(acac)$_2$ and 18.93 mg of tricyclohexyl phosphine dissolved in 1 ml of toluene as catalysts, and 18.93 mg of dimethylanilinium tetrakis(pentafluorophenyl)borate dissolved in 2 ml of CH$_2$Cl$_2$ as a cocatalyst were introduced. Then reaction was carried out at 80° C. for 17 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 4.69 g of 5-norbornene-2-yl acetate homopolymer (yield: 93.8 wt % of total monomer input). Number average molecular weight (Mn) of the polymer was 36,000, and weight average molecular weight (Mw) of the polymer was 88,000.

Example 15

Preparation of Allyl Acetate Norbornene Addition Homopolymer Using Tricyclohexyl Phosphine and Pd(acac)$_2$ as a Catalyst Into a 250 ml Schlenk flask, 5 g (30.1 mmol) of endo-rich allyl acetate norbornene prepared in the Preparation Example 4 as a monomer and 10 ml of purified toluene as a solvent were introduced. Into the flask, 1.83 mg of Pd(acac)$_2$ and 1.69 mg of tricyclohexyl phosphine dissolved in 3 ml of CH$_2$Cl$_2$ as catalysts, and 9.64 mg of dimethylanilinium tetrakis(pentafluorophenyl)borate as a cocatalyst were introduced. Then reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 4.79 g of allyl acetate norbornene homopolymer (yield: 95.8 wt % of total monomer input). Number average molecular weight (Mn) of the polymer was 78,000, and weight average molecular weight (Mw) of the polymer was 203,000.

Example 16

Preparation of Allyl Acetate Norbornene Addition Homopolymer Using Tricyclohexyl Phosphine and Pd(acetate)$_2$ as a Catalyst Into a 250 ml Schlenk flask, 10.0 g (60.2 mmol) of endo-rich allyl acetate norbornene prepared in the Preparation Example 4 as a monomer and 20 ml of purified toluene as a solvent were introduced. Into the flask, 1.35 mg of Palladium (II) acetate(Pd(acac)$_2$) and 1.69 mg of tricyclohexyl phosphine dissolved in 3 ml of CH$_2$Cl$_2$ as catalysts, and 12.03 mg of dimethylanilinium tetrakis(pentafluorophenyl)borate as a cocatalyst were introduced. Then reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 4.72 g of allyl acetate norbornene homopolymer (yield: 47.2 wt % of total monomer input). Number average molecular weight (Mn) of the polymer was 70,000, and weight average molecular weight (Mw) of the polymer was 140,000.

Example 17

Preparation of Addition Copolymer of Norbornene Carboxylic Acid Methylester/Norbornene Allyl Acetate Using Tricyclohexyl Phosphine and Pd(acetate)$_2$ as a Catalyst Into a 250 ml Schlenk flask, 9.16 g (60.2 mmol) of exo-rich norbornene carboxylic acid methyl ester prepared in Preparation Example 1 and 10.0 g (60.2 mmol) of endo-rich norbornene allyl acetate prepared in Preparation Example 4 as monomers, and 38 ml of purified toluene as a solvent were introduced. Into the flask, 2.7 mg of Pd(acetate)$_2$ and 3.37 mg of tricyclohexyl phosphine dissolved in 5 ml CH$_2$Cl$_2$ as catalysts, and 19.2 mg of dimethylanilinium tetrakis(pentafluorophenyl)borate as a cocatalyst were introduced. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 5.56 g of copolymer of norbornene carboxylic acid methyl ester and norbornene allyl acetate (yield: 29.0 wt % of total monomer input). Number average molecular weight (Mn) of the polymer was 53,000, and weight average molecular weight (Mw) of the polymer was 122,000.

Example 18

Preparation of Addition Copolymer of Norbornene Carboxylic Acid Methylester/Norbornene Allyl Acetate Using Tricyclohexyl Phosphine and Pd(acetate)$_2$ as a Catalyst Into a 250 ml Schlenk flask, 14.96 g (98.3 mmol) of exo-rich norbornene carboxylic acid methyl ester prepared in Preparation Example 1 and 7.0 g (42.1 mmol) of endo-rich norbornene allyl acetate prepared in Preparation Example 4 as monomers, and 43 in of purified toluene solvent were introduced. Into the flask, 3.15 mg of Pd(acetate)$_2$ and 3.94 mg of tricyclohexyl phosphine dissolved in 5 ml CH$_2$Cl$_2$ as catalysts, and 22.49 mg of dimethylanilinium tetrakis(pentafluorophenyl)borate as a cocatalyst were introduced. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 8.81 g of copolymer of norbornene carboxylic acid methyl ester and norbornene allyl acetate (yield: 40.1 wt % of total monomer input). Number average molecular weight (Mn) of the polymer was 41,000, and weight average molecular weight (Mw) of the polymer was 100,000.

Example 19

Preparation of Addition Copolymer of Norbornene Carboxylic Acid Methylester/Norbornene Allyl Acetate Using Tricyclohexyl Phosphine and Pd(acetate)$_2$ as a Catalyst Into a 250 ml Schlenk flask, 5.89 g (38.7 mmol) of exo-rich norbornene carboxylic acid methyl ester prepared in Preparation Example 1 and 15.0 g (90.2 mmol) of endo-rich norbornene allyl acetate prepared in Preparation Example 4 as monomers, and 41 in of purified toluene solvent were introduced. Into the flask, 2.89 mg of Pd(acetate)$_2$ and 3.62 mg of tricyclohexyl phosphine dissolved in 5 in CH$_2$Cl$_2$ as catalysts, and 20.66 mg of dimethylanilinium tetrakis(pentafluorophenyl)borate as a cocatalyst were introduced. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 10.48 g of copolymer of norbornene carboxylic acid methyl ester and norbornene allyl acetate (yield: 50.2 wt % of total monomer input). Number average molecular weight (Mn) of the polymer was 59,000, and weight average molecular weight (Mw) of the polymer was 144,000.

Example 20

Preparation of Addition Copolymer of Norbornene Carboxylic Acid Butylester/Norbornene Allyl Acetate Using Tricyclohexyl Phosphine and Pd(acetate)$_2$ as a Catalyst Into a 250 ml Schlenk flask, 9.35 g (48.1 mmol) of exo-rich norbornene carboxylic acid butyl ester prepared in Preparation Example 3 and 8.0 g (48.1 mmol) of endo-rich norbornene allyl acetate prepared in Preparation Example 4 as monomers, and 35.24 ml of purified toluene solvent were introduced. Into the flask, 2.16 mg of Pd(acetate)$_2$ and 2.70 mg of tricyclohexyl phosphine dissolved in 5 in CH$_2$Cl$_2$ as catalysts, and 15.42 mg of dimethylanilinium tetrakis(pentafluorophenyl)borate as a cocatalyst were introduced. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 2.89 g of copolymer of norbornene carboxylic acid butyl ester and norbornene allyl acetate (yield: 16.4 wt % of total monomer input). Number average molecular weight (Mn) of the polymer was 52,000, and weight average molecular weight (Mw) of the polymer was 97,000.

Example 21

Preparation of Addition Copolymer of Norbornene Carboxylic Acid Butylester/Norbornene Allyl Acetate Using Tricyclohexyl Phosphine and Pd(acetate)$_2$ as a Catalyst Into a 250 ml Schlenk flask, 15.0 g (77.2 mmol) of exo-rich norbornene carboxylic acid butyl ester prepared in Preparation Example 3 and 5.5 g (33.1 mmol) of endo-rich norbornene allyl acetate prepared in Preparation Example 4 as monomers, and 41.9 in of purified toluene solvent were introduced. Into the flask, 2.48 mg of Pd(acetate)$_2$ and 3.09 mg of tricyclohexyl phosphine dissolved in 5 ml CH$_2$Cl$_2$ as catalysts, and 17.67 mg of dimethylanilinium tetrakis(pentafluorophenyl)borate as a cocatalyst were introduced. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 4.63 g of copolymer of norbornene carboxylic acid butyl ester and norbornene allyl acetate (yield: 22.6 wt % of total monomer input). Number average molecular weight (Mn) of the polymer was 48,000, and weight average molecular weight (Mw) of the polymer was 91,000.

Example 22

Preparation of Addition Copolymer of Norbornene Carboxylic Acid Butylester/Norbornene Allyl Acetate Using Tricyclohexyl Phosphine and Pd(acetate)$_2$ as a Catalyst Into a 250 ml Schlenk flask, 6.51 g (33.5 mmol) of exo-rich norbornene carboxylic acid butyl ester prepared in Preparation Example 3 and 13.0 g (78.2 mmol) of endo-rich norbornene allyl acetate prepared in Preparation Example 4 as monomers, and 39.4 ml of purified toluene solvent were introduced. Into the flask, 2.51 mg of Pd(acetate)$_2$ and 3.13 mg of tricyclohexyl phosphine dissolved in 5 ml CH$_2$Cl$_2$ as catalysts, and 17.90 mg of dimethylanilinium tetrakis(pentafluorophenyl)borate as a cocatalyst were introduced. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 6.65 g of copolymer of norbornene carboxylic acid butyl ester and norbornene allyl acetate (yield: 34.1 wt % of total monomer input). Number average molecular weight (Mn) of the polymer was 56,000, and weight average molecular weight (Mw) of the polymer was 113,000.

Example 23

Preparation of Addition Copolymer of Butyl Norbornene and 5-Norbornene-2-yl Acetate Using Tricyclohexyl Phosphine and Pd(acac)$_2$ as a Catalyst Into a 250 ml Schlenk flask, 9.40 g (61.37 mmol) of exo-rich 5-norbornene-2-yl acetate (containing 88 mol % of exo) and 9.20 g (61.37 mmol) of butyl norbornene as monomers, and 35 ml of purified toluene solvent were introduced. Into the flask, 3.76 mg of Pd(acac)$_2$ and 3.46 mg of tricyclohexyl phosphine dissolved in 5 ml of toluene as catalysts, and 19.8 mg of dimethylanilinium tetrakis(pentafluorophenyl)borate dissolved in 2 ml CH$_2$Cl$_2$ as a catalyst were introduced. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 12.18 g of copolymer of 5-norbornene-2-yl acetate and butyl norbornene (yield: 65.5 wt % of total monomer input). Number average molecular weight (Mn) of the polymer was 93,000, and weight average molecular weight (Mw) of the polymer was 207,000.

Example 24

Preparation of Addition Copolymer of Hexyl Norbornene and 5-Norbornene-2-yl Acetate Using Tricyclohexyl Phosphine and Pd(acac)$_2$ as a Catalyst Into a 250 ml Schlenk flask, 9.40 g (61.37 mmol) of exo-rich 5-norbornene-2-yl acetate (containing 88 mol % of exo) and 11.01 g (61.37 mmol) of hexyl norbornene as monomers, and 39 ml of purified toluene solvent were introduced. Into the flask, 3.76 mg of Pd(acac)$_2$ and 3.46 mg of tricyclohexyl phosphine dissolved in 5 ml of toluene as catalysts, and 19.8 mg of dimethylanilinium tetrakis(pentafluorophenyl)borate dissolved in 2 ml CH$_2$Cl$_2$ as a cocatalyst were introduced. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 14.31 g of copolymer of 5-norbornene-2-yl acetate and hexyl norbornene (yield: 70.1 wt % of total monomer input). Number average molecular weight (Mn) of the polymer was 104,000, and weight average molecular weight (Mw) of the polymer was 243,000.

Example 25

Preparation of Addition Copolymer of Phenyl Norbornene and Norbornene Carboxylic Acid Butylester Using Tricyclohexyl Phosphine and Pd(acetate)$_2$ as a Catalyst Into a 250 ml Schlenk flask, 7.0 g (41.1 mmol) of phenyl norbornene and 6.13 g (41.1 mmol) of the exo-rich norbornene carboxylic acid butylester prepared in Preparation Example 3 as monomers, and 28 ml of purified toluene solvent were introduced. Into the flask, 1.85 mg of Pd(acetate)$_2$ and 2.31 mg of tricyclohexyl phosphine dissolved in 3 ml of CH$_2$Cl$_2$ as catalysts, and 13.18 mg of dimethylanilinium tetrakis(pentafluorophenyl)borate as a cocatalyst were introduced. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 9.5 g of copolymer of phenyl norbornene and norbornene carboxylic acid butylester (yield: 72.4 wt % of total monomer input). Number average molecular weight (Mn) of the polymer was 109,000, and weight average molecular weight (Mw) of the polymer was 265,000.

Example 26

Preparation of Copolymer of Norbornene Carboxylic Acid Methylester and Norbornene Allyl Acetate Using Tricyclohexyl Phosphine and Pd(acetate)$_2$ as a Catalyst Into a 250 ml Schlenk flask, 9.16 g (60.2 mmol) of exo-rich norbornene carboxylic acid methyl ester prepared in Preparation Example 1 and 10.0 g (60.2 mmol) of endo-rich norbornene allyl acetate prepared in Preparation Example 4 as monomers, and 38 in of purified toluene solvent were introduced. Into the flask, 2.7 mg of Pd(acetate)$_2$ and 3.37 mg of tricyclohexyl phosphine dissolved in 5 ml CH$_2$Cl$_2$ as catalysts, and 19.2 mg of dimethylanilinium tetrakis(pentafluorophenyl)borate as a cocatalyst were introduced. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 5.56 g of copolymer of norbornene carboxylic acid methyl ester and norbornene allyl acetate (yield: 29.0 wt % of total monomer input). Number average molecular weight (Mn) of the polymer was 53,000, and weight average molecular weight (Mw) of the polymer was 122,000.

Example 27

Surface Tension Measurement of Butylester Norbornene Homopolymer

In order to measure surface tension of butyl ester norbornene polymer prepared in Example 2, it was dissolved in toluene to 20 wt % and cast on a petri dish. After 3 hours at room temperature, the dish was dried at 120° C. for 6 hours to ohtait a film having a thickness of 120 μm. Surface tension of the film was calculated from contact angles of H$_2$O and CH$_2$I$_2$, by the following Equation 1. (Wu, S. J. Polym. Sci. Vol. 34, p 19, 1971).

$$\gamma_S = \gamma_{SL} + \gamma_{LV}\cos\theta \qquad \text{[Equation 1]}$$

$$\gamma_{SL} = \gamma_S + \gamma_{LV} - 4\left(\frac{\gamma_{LV}^d \gamma_S^d}{\gamma_{LV}^d + \gamma_S^d} + \frac{\gamma_{LV}^p \gamma_S^p}{\gamma_{LV}^p + \gamma_S^p}\right)$$

In Equation 1, $\gamma_S$ is the surface tension of the film; $\gamma_{LV}$ is the surface tension of the liquid; $\gamma_{SL}$ is the interfacial tension of film and liquid; $\theta$ is the contact angle; $\gamma^d$ is the distribution (dispersion) term of surface tension; and $\gamma^p$ is the polar term of surface tension.

For water ($\gamma^d$=44.1, $\gamma^D$=6.7 mN/m), the contact angle was 74.3° and for ditodotnetltane ($\gamma^d$=22.1, $\gamma^p$=50.7 mN/m), 33.5°. From these values, the surface tension was calculated to be 49.5 mN/m.

Example 28

Metal Adhesivity Test of butylester Norbonene Homopolymer

In order to test metal adhesivity of butyl ester norbornene homopolymer prepared in Example 2, it was dissolved in toluene to 10 wt % and coated on glass plates respectively having chrome, aluminum and tungsten patterns to a thickness of ~2 μm. Horizontal and vertical lines were drawn to form lattice patterns on the glass plate with 5 mm spacing, and a 180° taping test was carried out. None of the three lattice patterns were separated from the glass plate.

Example 29

Adhesivity to PVA Polarizer of Butyl Ester Norbornene Homopolymer

To enhance the adhesivity, a PVA polarizer was treated with a butyl ester norbornene film that was casted in Example 27. The film was corona surface-treated 3 times with an 80 mA current at a line speed of 6 rn/mm. Contact angles were 20.7° for water and 22° for diiodomethane. Surface tension was calculated to be 76.9 mN/m.

Within 30 minutes after the corona treatment, the fully dried PVA polarizer (iodine type; transotissivity=44%) was roll-pressed with a 10 wt % PVA aqueous solution, and then dried at 80° C. for 10 minutes. The PVA polarizer roll-pressed with butyl ester norbornene had very superior adhesivity.

Example 30

Identification for Multi Component Catalyst System

The results of measuring $^{31}P$ NMR of the catalyst system prepared in Example 16 at 25° C., 60° C., 90° C., 110° C. and 120° C. were shown in FIG. 7. Also, the results of measuring $^{31}P$ NMR of the mixture of the catalyst system prepared in Example 16 and monomer at 25° C., 60° C., 90° C., 110° C. and 120° C. were shown in FIG. 8. From the results of FIG. 7 and FIG. 8, it can be seen that the catalyst system of Example 16 is not a single component system but a multi component system.

The invention claimed is:

1. A catalyst system for preparing a cyclic olefin addition polymer, comprising:
   a) a Group X transition metal compound;
   b) a compound comprising a neutral Group XV electron donor ligand having a cone angle of at least 160°; and
   c) a salt capable of offering an anion that can be weakly coordinated to the transition metal of the a) the Group X transition metal compound,
   wherein said a) the Group X transition metal compound is represented by the following Chemical Formula 1:

$$M(R)_2 \qquad \text{[Chemical Formula 1]}$$

wherein M is a Group X metal; and
   R is an anionic ligand of acetylacetonate (R"C(O)CHC(O)R"), or acetate group offering σ- and π-bonds, wherein each of R" is hydrogen; $C_1$ to $C_{20}$ linear or branched alkyl; $C_2$ to $C_{20}$ linear or branched alkenyl, or vinyl; $C_5$ to $C_{12}$ cycloalkyl substituted with hydrocarbon or unsubstituted; $C_6$ to $C_{40}$ aryl substituted with hydrocarbon or unsubstituted; $C_6$ to $C_{40}$ aryl having hetero atom; $C_7$ to $C_{15}$ aralkyl substituted with hydrocarbon or unsubstituted; or $C_3$ to $C_{20}$ alkynyl.

2. The catalyst system according to claim 1, comprising:
   a) 1 mol of the Group X transition metal compound;
   b) 1 to 3 mols of the compound comprising a neutral Group XV electron donor ligand having a cone angle of at least 160°; and
   c) 1 to 2 mols of the salt capable of offering an anion that can be weakly coordinated to the transition metal of the a) the Group X transition metal compound.

3. The catalyst system according to claim 1, wherein said b) the compound comprising a neutral Group XV electron donor ligand having a cone angle of at least 160° is represented by the following Chemical Formula 2 or Chemical Formula 3:

$$P(R^5)_{3-c}[X(R^5)_d]_c \qquad \text{[Chemical Formula 2]}$$

wherein X is oxygen, sulfur, silicon or nitrogen;
   c is an integer of 0 to 3; d is 1 if X is oxygen or sulfur, 3 if X is silicon, and 2 if X is nitrogen;
   if c is 3 and X is oxygen, two or three $R^5$ groups may be connected with each other through oxygen to form a cyclic group; and if c is 0, two $R^5$ groups may be connected with each other to form a phosphacycle; and
   $R^5$ is hydrogen; a $C_1$ to $C_{20}$ linear or branched alkyl; a $C_1$ to $C_{20}$ linear or branched alkoxy; $C_2$ to $C_{20}$ alkyl, alkenyl, or vinyl; a $C_5$ to $C_{12}$ cycloalkyl substituted with hydrocarbon or unsubstituted; a $C_6$ to $C_{40}$ aryl substituted with hydrocarbon or unsubstituted; a $C_7$ to $C_{15}$ aralkyl substituted with hydrocarbon or unsubstituted; a $C_3$ to $C_{20}$ alkynyl; a tri($C_1$ to $C_{10}$ linear or branched alkyl)silyl; a tri($C_1$ to $C_{10}$ linear or branched alkoxy) silyl; a tri($C_5$ to $C_{12}$ cycloalkyl substituted with hydrocarbon or unsubstituted) silyl; a tri($C_6$ to $C_{40}$ aryl substituted with hydrocarbon or unsubstituted) silyl; a tri($C_6$ to $C_{40}$ aryloxy substituted with hydrocarbon or unsubstituted) silyl; a tri($C_1$ to $C_{10}$ linear or branched alkyl) siloxy; or a tri($C_5$ to $C_{12}$ cycloalkyl substituted with hydrocarbon or unsubstituted) siloxy; or a tri($C_6$ to $C_{40}$ aryl substituted with hydrocarbon or unsubstituted) siloxy, wherein each substituent can be further substituted by a linear or branched haloalkyl or halogen; and $$(R^5)_2P—(R^6)—P(R^5)_2 \qquad \text{[Chemical Formula 3]}$$

wherein $R^5$ is the same as defined in Chemical Formula 2; and
   $R^6$ is a $C_1$ to $C_5$ linear or branched alkyl; $C_2$ to $C_5$ alkenyl or vinyl; a $C_5$ to $C_{12}$ cycloalkyl substituted with hydrocarbon or unsubstituted; a $C_6$ to $C_{20}$ aryl substituted with hydrocarbon or unsubstituted; or a $C_7$ to $C_{15}$ aralkyl substituted with hydrocarbon or unsubstituted.

4. The catalyst system according to claim 1, wherein said b) the compound comprising a neutral Group XV electron donor ligand having a cone angle of at least 160° has a cone angle of at least 180°.

5. The catalyst system according to claim 1, wherein said c) the salt capable of offering an anion that can be weakly coordinated to the transition metal of the a) the Group X transition metal compound is represented by the following Chemical Formula 4:

$$[Cat]_a[Anion]_b \qquad \text{[Chemical Formula 4]}$$

wherein "Cat" is a cation selected from a group consisting of a hydrogen ion; a cation of a Group I metal, Group II metal, or transition metal; and an organic group comprising the cations, to which said b) the neutral Group XV electron donor compound can be weakly bonded;
   "Anion", which can be weakly coordinated to the transition metal of the a) the Group X transition metal compound, is selected from a group consisting of borate, aluminate, $SbF_6$, $PF_6$, $AlF_3O_3SCF_3$, $SbF_5SO_3F$, $AsF_6$, perfluoroacetate($CF_3CO_2$), perfluoropropionate($C_2F_5CO_2$), perfluorobutyrate($CF_3CF_2CF_2CO_2$), perchlorate($ClO_4$), p-toluene sulfonate(p-$CH_3C_6H_4SO_3$), boratabenzene and caborane substituted by hydrocarbon or unsubstituted; and a and b respectively represent the mole ratio of cations and anions, determined for the compound of Chemical Formula 4 so as to satisfy charge neutrality.

6. The catalyst system according to claim 1, wherein a) the Group X transition metal compound; b) the compound comprising a neutral Group XV electron donor ligand having a cone angle of at least 160°; and c) the salt capable of offering an anion that can be weakly coordinated to the transition metal of the a) the Group X transition metal compound may be in the mixture of multi component by existing respectively or by reacting each other to form at least two kinds of complex.

7. The catalyst system according to claim 6, wherein the complex is represented by the following Chemical Formula 8;

$$[R_xMA_yB_z]_aD_b \qquad \text{[Chemical Formula 8]}$$

wherein M is a Group X metal;

R is an $(R')_2N$ or $(R')_2P$ ligand, or an anionic ligand offering σ- and π-bonds such as hydrocarbyl, acetylacetonate (R" C(O)CHC(O)R"), or acetate group, wherein each of R' and R" is hydrogen; $C_1$ to $C_{20}$ linear or branched alkyl; $C_2$ to $C_{20}$ linear or branched alkenyl, or vinyl; $C_5$ to $C_{12}$ cycloalkyl substituted with hydrocarbon or unsubstituted; $C_6$ to $C_{40}$ aryl substituted with hydrocarbon or unsubstituted; $C_6$ to $C_{40}$ aryl having hetero atom; $C_7$ to $C_{15}$ aralkyl substituted with hydrocarbon or unsubstituted; or $C_3$ to $C_{20}$ alkynyl, x is 0, 1 or 2; A is a compound comprising a neutral Group XV electron donor ligand having a cone angle of at least 160°, y is 1 or 2;

B is a solvent, diluent or a monomer used in polymerization, z is 0, 1 or 2;

x+y+z=3;

D is an anion in the salts of the c);

a and b respectively represent the mole ratio of $[R_xMA_yB_z]$ and D, determined for the complex so as to satisfy charge neutrality.

* * * * *